US008370630B2

(12) United States Patent
Ogawa

(10) Patent No.: US 8,370,630 B2
(45) Date of Patent: Feb. 5, 2013

(54) CLIENT DEVICE, MAIL SYSTEM, PROGRAM, AND RECORDING MEDIUM

(75) Inventor: Keiko Ogawa, Arakawa-ku (JP)

(73) Assignee: Keiko Ogawa, Tokyo (JP)

( * ) Notice: Subject to any disclaimer, the term of this patent is extended or adjusted under 35 U.S.C. 154(b) by 872 days.

(21) Appl. No.: 12/302,621

(22) PCT Filed: Jul. 31, 2006

(86) PCT No.: PCT/JP2006/315130
§ 371 (c)(1),
(2), (4) Date: Jul. 17, 2009

(87) PCT Pub. No.: WO2007/138717
PCT Pub. Date: Dec. 6, 2007

(65) Prior Publication Data
US 2010/0049978 A1    Feb. 25, 2010

(30) Foreign Application Priority Data
May 30, 2006  (JP) .................................. 2006-150193

(51) Int. Cl.
*H04L 29/06*  (2006.01)
(52) U.S. Cl. ........ 713/170; 713/150; 713/151; 713/152; 713/153; 713/171; 709/225; 709/229; 380/255; 380/256; 380/270; 380/271; 380/272; 380/273; 380/274; 726/11; 726/12; 726/13; 726/14; 726/15
(58) Field of Classification Search .......... 713/150–153, 713/160; 709/225, 229; 380/255–256, 270–274
See application file for complete search history.

(56) References Cited

U.S. PATENT DOCUMENTS

| 6,070,245 | A  | * | 5/2000  | Murphy et al. ................... 726/3 |
| 6,732,101 | B1 | * | 5/2004  | Cook ..................................... 1/1 |
| 6,865,671 | B1 | * | 3/2005  | Assmann ....................... 713/154 |
| 7,254,712 | B2 | * | 8/2007  | Godfrey et al. ............... 713/176 |
| 2002/0048052 | A1 | * | 4/2002 | Hayashi ........................ 358/450 |
| 2005/0223226 | A1 |  | 10/2005 | Sundararajan |

FOREIGN PATENT DOCUMENTS

| JP | 6 276221   | 9/1994 |
| JP | 2005 295509 | 10/2005 |

OTHER PUBLICATIONS

Changyan Peng et al. NPL Document, Improved TLS Handshake Protocols Using Identity-Based Cryptography., 2009 International Symposium on Information Engineering and Electronic Commerce.*

(Continued)

*Primary Examiner* — Taghi Arani
*Assistant Examiner* — Josnel Jeudy
(74) *Attorney, Agent, or Firm* — Oblon, Spivak, McClelland, Maier & Neustadt, L.L.P.

(57) ABSTRACT

A mail system having high security is realized by mounting TCP2 for mail communication between client apparatuses. The present invention relates to a mail communication system which is connected to a network and exchanges mails between client apparatuses provided with the existing mailers, and each client apparatus is mounted with a TCP2 driver. A TCP2 driver 34 includes a TCP2 core 36 and a mail system core 37 and an e-mail received via the network is processed in this TCP2 driver 34 and thereafter, is supplied to an existing mailer 31 of the client apparatus. In the mail system core 37 of the TCP2 driver 34, control of mail encryption and decryption, deletion of an unnecessary mail and the like is carried out.

7 Claims, 21 Drawing Sheets

OTHER PUBLICATIONS

Brown, Ian et al., "A Proxy Approach to E-mail Security", Software-Practice and Experience, vol. 29, No. 12, pp. 1049-1060, (1999).

Branstad, Martha et al., "The Role of Trust in Protected Mail", IEEE, Proceedings of the 1990 IEEE Computer Society Symposium on Research in Security and Privacy, Crypto-control Routines $2^{nd}$ Paragraph, pp. 210-215, (1990).

PopTray 2.1 Open-Source Mail Notifier, Retrieved from the Internet: http://web.archive.org/web/20030527011635/http://www.poptray.org/screenshots.php, (2007).

* cited by examiner

*FIG. 7*

| Hold | Sender | Reception | Scrap |
|---|---|---|---|
| Secret Code | xxxx@tttnet.nejp | ▨ | ▨ |
| Secret Code | xxxx@tttnet.nejp | ▨ | ▨ |
| Attachment | yyyyyy@tttnet.nejp | ▨ | ▨ |
| HTML | zzzzzzz@tttnet.nejp | ▨ | ▨ |
| Secret Code | xxxx@tttnet.nejp | ▨ | ▨ |
| Secret Code | xxxx@tttnet.nejp | ▨ | ▨ |
| Attachment | xxxx@tttnet.nejp | ▨ | ▨ |
| Secret Code | xxxx@tttnet.nejp | ▨ | ▨ |

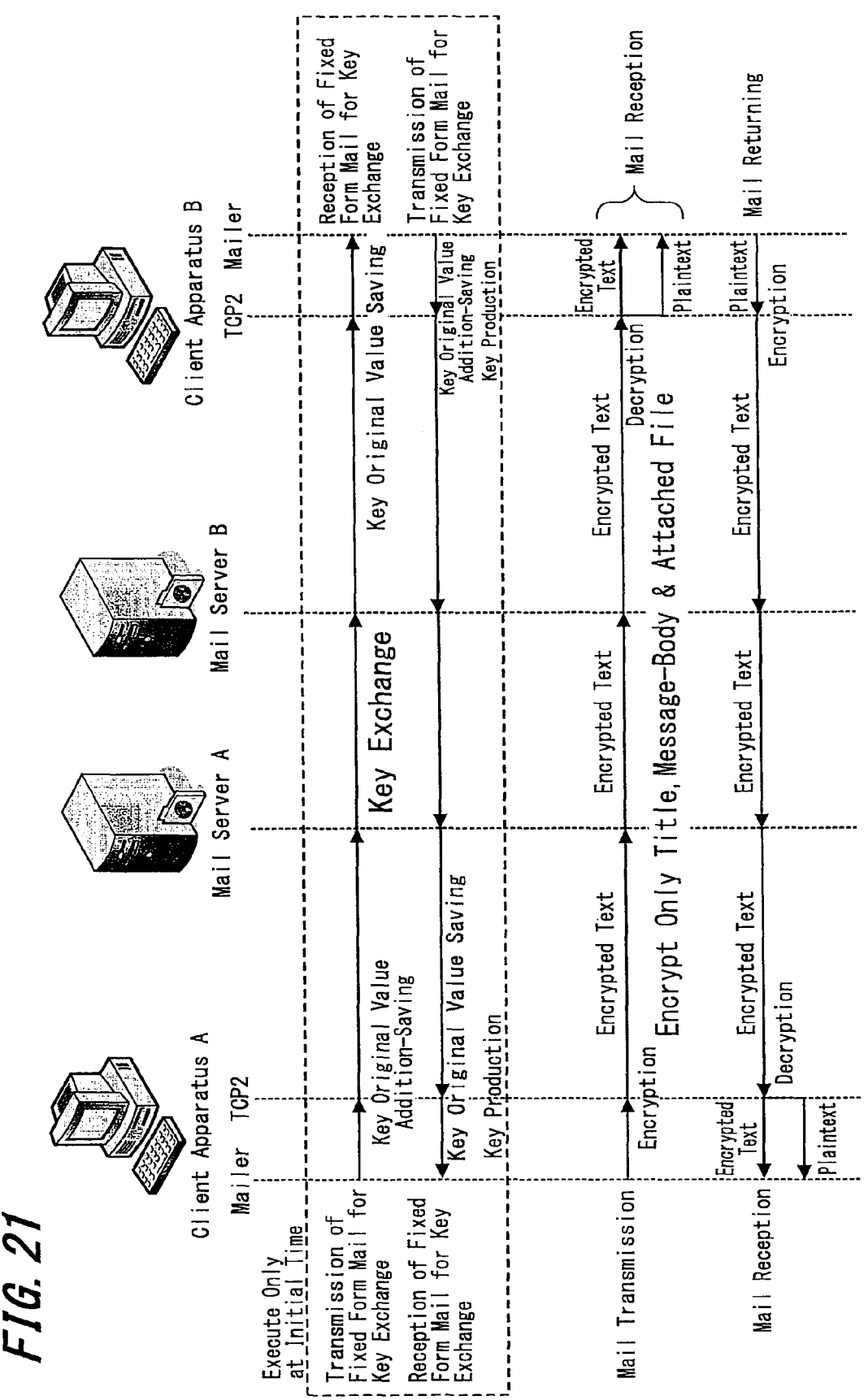

CLIENT DEVICE, MAIL SYSTEM, PROGRAM, AND RECORDING MEDIUM

TECHNICAL FIELD

The present invention relates to a client system and a mail system which emphasize security in communication and more particularly to a client system, a mail system which are strong against unjustified disturbance such as "leakage", "falsifying" and "masquerading" of data and "approach" or "attack" on data on the internet and a computer program realizing thereof.

BACKGROUND ART

In recent years, communication utilizing the Internet has been spreading and expanding rapidly in society, because anybody who has at least a personal computer can access a computer on a network only by connecting it to the network. On the other hand, the social problem has become large being accompanied by the spread and expansion of Internet communication where a hacker or a cracker invades a computer system of other people so as to sneak a look at software and data and to carry out falsifying or breakdown thereof.

Speaking of a specific case of unjustified disturbance, first, there is a system disturbance by transmitting a large amount of messages through the network for disturbing the operation of the computer system such that the central system will come not to be used. When the host becomes overloaded owing to this disturbance, it also might happen that the system shuts down.

Also, there is an unjustified disturbance of "unauthorized access and masquerading" by acquiring a password in the host for stealing confidential information, carrying out falsifying and breakdown of information and the like. There is an ugly case in this disturbance such that information possessed by the computer is rewritten arbitrarily so as to deceive a person. Further, also an unjustified activity caused by spyware occurs where a specific personal computer is secretly invaded and personal confidential data such as mail addresses and passwords are exploited. Also, there is a possibility of so-called wiretapping frequently happened to unjustly sneak a look at database contents in the computer connected to the network as mentioned above.

Also, there may occur an action for stealing personal information intentionally in the site or in the managing source of the server and a crisis such as cyber terrorism by a spy lurking within a company or the like.

Further, unjustified disturbance such as feeding "virus" which is a program causing a failure in computers of other people is increasing recently. The personal computers used at home for mails or the like are infected with such fed virus and when it is connected to computers within a company, the whole computers within the company are infected therewith and/or the virus will breakdown files in the computer and furthermore, the whole network may be down.

Therefore, in a communication on the internet utilizing a conventional TCP/IP (Transmission Control Protocol/Internet Protocol) or UDP (User Datagram Protocol), encryption communication called IPsec (IPsec: Security Architecture for Internet Protocol) or SSL (Secure Socket Layer) is utilized as a function for preventing "leakage", "falsifying" or the like of data.

The feature of IPsec lies not only in merely encrypting specific application but also in encrypting every communication sent from the host at an IP level. In this manner, it becomes possible for a user to have a secure communication without being conscious of the application. Also, IPsec makes it possible to change an encryption algorithm to be used without changing its own structure so that it can be used in the future.

Also, by utilizing SSL, it becomes possible for a client and a server to authenticate each other on the network, and it becomes possible to exchange highly confidential information such as credit card information or the like by encrypting it. In this manner, it is possible to prevent wiretapping of data, resending attack (attack of transmitting data to be flown on the network many times repeatedly by wiretapping), masquerading (communication by masquerading another person himself), falsifying of data and the like.

In the encryption communication used in the present invention, encryption function is added to a TCP layer which is in a transport layer (fourth layer of OSI). The transport layer is a protocol layer for realizing a hypothetical communication path without error between two processes executed on respective nodes. It is possible to send data by the network layer, but there is no guarantee that the data will certainly arrive at a destination. Also, there is no guarantee either that the data will arrive correctly in the sent order. Therefore, it is the transport layer to offer a communication path without error so that it is easy to be used for the application. An example of a communication system resistant against unjustified invasion from outside realized by adding encryption function to the transport layer of the fourth layer was proposed by the present inventors for the first time leading the world and the present inventors named this encryption communication system as "TCP2" (see Patent Document 1).

Patent Document 1 WO2005/015827

DISCLOSURE OF THE INVENTION

However, the invention described in the Patent Document 1 is restricted to a general encryption communication system, communication method, communication apparatus and communication programs which utilize TCP2 and a mail system equipped with TCP2 have not yet been realized.

An object of the present invention is to provide a mail system with encryption function and a program realizing it using a communication system utilizing "TCP2" which the inventors proposed previously.

More specifically, the object of the present invention is to provide an e-mail system and the program thereof in which the e-mail transmission/reception encrypted End-to-End can be carried out by mounting TCP2 on a transmitting side client and a reception side client of the e-mail.

In order to solve the above-described problems and accomplish the object of the present invention, there is provided a client apparatus used in a mail system of the present invention connected to a network and including an existing mailer carrying out mail communication between a plurality of client apparatuses. The client apparatus includes a TCP2 driver including a TCP2 core and a mail system core and a TCP2 mail system application unit other than the existing mailer. The TCP2 core includes means for recognizing a packet of an e-mail transmitted from the existing mailer or the protocols of SMTP and POP3 and for transmitting it to the mail system core. The mail system core includes means for encrypting or decrypting the mail to be transmitted and received, means for carrying out key exchange with other client apparatus, means for saving an IP address and port of the POP3 and an IP address and port of the SMTP, means for saving a user ID and password, and e-mail addresses of the sender and the receiver, means for saving a key formed by the key exchange, and means for selecting and deleting an encrypted mail, an HTML mail or an attached file. The TCP2 mail application unit includes means for carrying out a display of the key status in connection with the e-mail transmitted from the mail system core and for carrying out a list display of a status of the e-mail including encryption or non-encryption of the e-mail, mail type, attached file, and the mail address of the sender, and means for displaying the encrypted mail received by the existing mailer in plaintext. The e-mail received via the network is selected and processed by the TCP2 driver and thereafter is supplied to the existing mailer, and the mail transmitted to the other client apparatus from the existing mailer via the network is set so as to be transmitted after the other client apparatus of the receiver is confirmed by the TCP2 driver.

The mail system of the present invention is a mail system in which mail communication is carried out between a plurality of client apparatuses connected to a network and having an existing mailer. The client apparatus includes a TCP2 driver including a TCP2 core and a mail system core and a TCP2 mail application unit in addition to the existing mailer. The TCP2 core of the TCP2 driver is connected to the existing mailer or the network and configured to send a packet of an e-mail transmitted from a protocol of SMTP or POP3 of a mail server to the mail system core. The mail system core is configured to carry out encryption or decryption of transmitted and received mails, carry out key exchange with a sender or receiver, save an IP address and port number of the POP3, an IP address and port number of the SMTP, a user ID and password, e-mail addresses of the sender or the receiver, store a key formed by the key exchange on a storage medium, and delete the received e-mail selectively. The mail system is characterized in that the TCP2 mail system application unit carries out a display of a key status in connection with the e-mail transmitted from the mail system core and carries out a list display of transmitted and received mails and a plaintext display of the encrypted mail received by the existing mailer.

Also, a mail communication program used in the mail system of the present invention is implemented with a TCP2 mail system function having three functions of a TCP2 core, a mail system core and a TCP2 mail application other than the existing mailer function on each of client apparatus computers communicating with each other. The function of the TCP2 core is connected to a network and includes a function for recognizing a packet of the e-mail transmitted from the existing mailer, or a protocol of a mail server SMTP or POP3 and transmitting it to a mail system core. Also, the function of the mail system core includes a function for carrying out encryption or decryption of transmitted and received e-mails, for carrying out key exchange with a sender or receiver, for saving an IP address and port number of the POP3, an IP address and port number of the SMTP, a user ID and password, e-mail addresses of the sender and the receiver and a key formed by the key exchange on a storage medium and for deleting the received e-mail selectively. Further, the function of the TCP2 mail system application includes a function for carrying out a display of a key status in connection with the e-mail transmitted from the mail system core and for carrying out a list display of transmitted and received mails and a plaintext display of the encrypted mail received by the existing mailer. The mail communication program of the present invention is a program to cause the client apparatus computer to realize respective functions thereof. In addition, a recording medium recorded with the mail communication program is included as an embodiment of the present invention.

According to the mail system of the present invention, since a TCP2 function is used to encrypt/decrypt packets of a title, message body and attached file of an e-mail, only an authorized person can find the content of the e-mail without being known to other persons.

Also, the mail transmission and reception protocol (SMTP, POP3 command) and the mail header finalizer, the MIME identifier remain in plaintext, so that there is an effect that the mail application or the mail server which has been used in the client apparatus can be used without change.

BRIEF DESCRIPTION OF DRAWINGS

FIG. 7 is a diagram showing a list of received mails displayed on an output apparatus by a TCP2 mail system application.

FIG. 21 is a diagram for explaining an outline of an example of a TCP2 mail system of the present invention.

BEST MODE FOR CARRYING OUT THE INVENTION

Hereinafter, embodiments of the present invention will be described with reference to the drawings.

Figure 1:
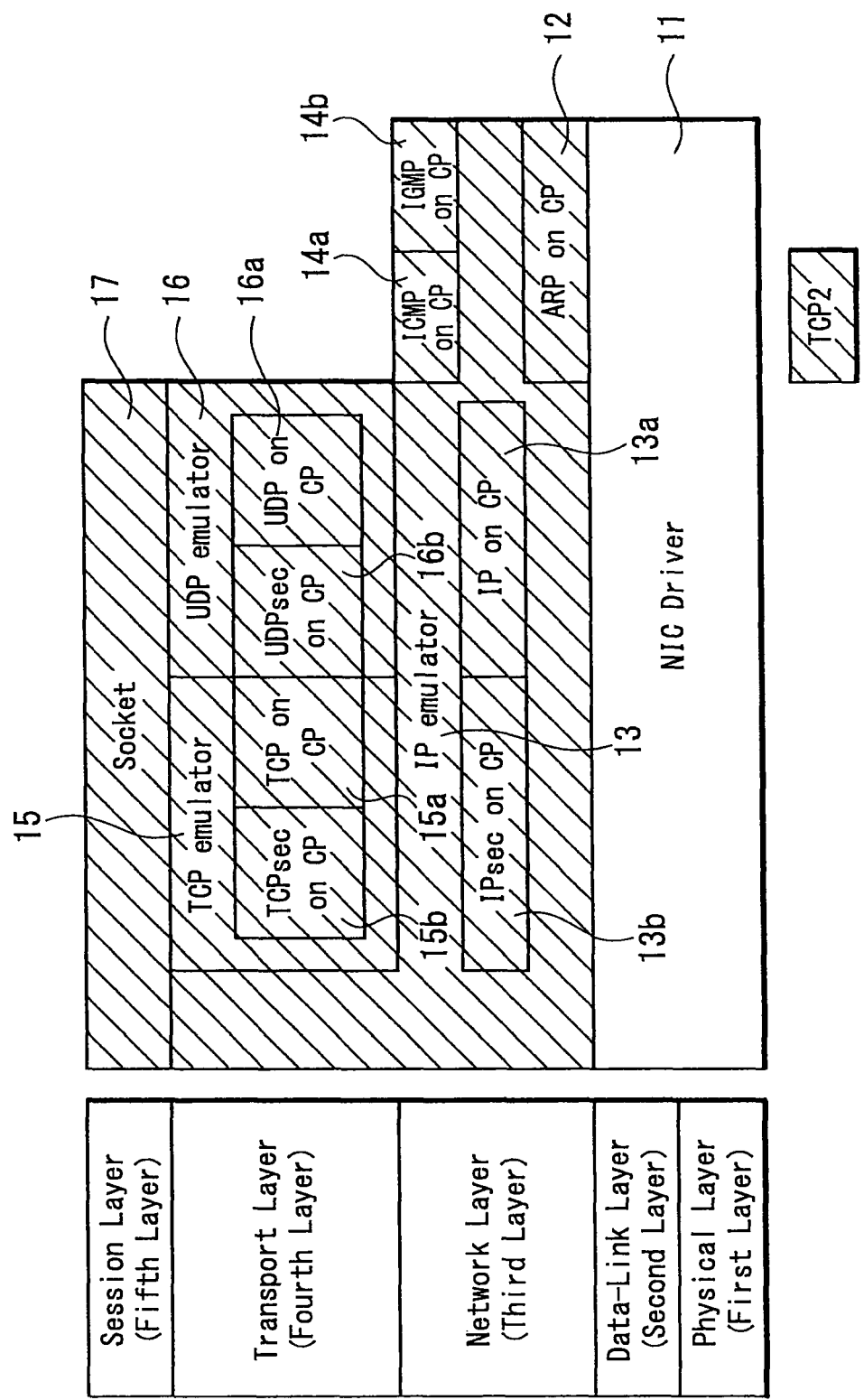
FIG. 1 is a diagram showing protocol stacks of TCP2 used for a mail system of the present invention.

FIG. 1 shows a TCP2 protocol stack used in an encryption communication system of the present invention.

<Description of TCP2 Protocol Stack>

This protocol stack includes a NIC (Network Interface Card) driver 11 arranged as a layer corresponding to a physical layer (first layer) and a data-link layer (second layer) of OSI seven layers. The driver is provided for connecting hardware such as a computer to a network and the content thereof is data transmission and reception control software. For example, a LAN board or a LAN card for connecting to Ethernet corresponds thereto.

An IP emulator (emulator) 13 which is partially extended to a transport layer (fourth layer) is in a network layer of the third layer. A transport function is not mounted on the portion extended to the transport layer and only offers a function of the network layer to a session layer (fifth layer). The IP emulator 13 is configured to carry out an operation using "IPsec on CP" 13b which is a protocol carrying out an encryption communication or "IP on CP" 13a by switching between them depending on the intended use. Here, the words "on CP" indicates that a cracking-protector (CP) observes "approach" and "attack" of an object and abandonment, cutoff or passing restriction thereof or that such observation can be carried out by setting thereof.

Also, the network layer is arranged with ARP on CP (Address Resolution Protocol on Cracking Protector). The ARP on CP is a protocol used for finding a MAC (Media Access Control) address, which is a physical address of Ethernet, from an IP address including a protective measure against a cracker. MAC is a transmission control technology utilized in LAN or the like and referred to as medium access control and is used as a technology for defining a transmitting and receiving method of a frame which is a transmitting and receiving unit of data, a frame format, an error correction or the like.

Here, the IP emulator 13 is software or firmware for allowing various kinds of security functions according to the present invention to be matched with a conventional IP periphery stack. More specifically, the IP emulator 13 is software, firmware or hardware (electronic circuit, electronic components) for allowing various kinds of security functions to be matched with an ICMP (Internet Control Message Protocol) 14a, an IGMP (Internet Group Management Protocol) 14b, TCP 15 and UDP 16 and further to a Socket interface 17. The IP emulator 13 may carry out encryption and decryption of IPsec and processing before and after the encryption and decryption such as processing of adding necessary authentication information and authentication. It should be noted that the ICMP is a protocol for transferring an IP error message or a control message and the IGMP is a protocol for controlling a host group configured to efficiently distribute the same data to a plurality of hosts or to receive the data distribution.

A TCP emulator 15 and a UDP emulator 16 are arranged in the transport layer (fourth layer) that is a layer above the IP emulator 13. The TCP emulator 15 is configured to carry out an operation using "TCPsec on CP" 15b which is a protocol for carrying out an encryption communication or "TCP on CP" 15a which is an ordinarily communication protocol by switching between them depending on the intended use. Similarly, the UDP emulator 16 is configured to carry out an operation using "UDPsec on CP" 16b which is a protocol carrying out an encryption communication and "UDP on CP" 16a which is an ordinarily communication protocol by switching between them depending on the intended use.

Also, the most specific feature of TCP2 lies in that the encryption communication protocols of TCPsec 15b and UDPsec 16b are mounted in the transport layer (fourth layer).

The socket interface 17 carrying out data exchange with a protocol such as TCP, UDP and the like is provided in an session layer (fifth layer) which is a layer above the transport layer (fourth layer). The socket means a network address, as already described, obtained by combining an IP address corresponding to an address of a computer in a network with a port number which is a sub address of the IP address. Practically, the socket interface 17 is configured with a single software program module carrying out addition or deletion of a series of headers all together (execution program or the like) or a single hardware module (electronic circuit, electronic components or the like).

The TCP emulator 15 carries out an operation in the transport layer of distributing packets to one of the TCPsec 15b which has a function of preventing data leakage and falsifying, that is, a function of encryption, integrity authentication, authentication or the like and an ordinarily protocol TCP 15a which may not have a function of such encryption, integrity authentication, authentication or the like. Also, both the TCPsec 15b and TCP 15a include a cracking-protector (CP), so that it is possible to realize a defending function against "approach" and "attack" by a cracker in the case where any of the protocols is selected. The TCP emulator 15 also plays a role of interface with the socket positioned in an upper layer.

Also, as already described, the UDP may not have an error compensation function while the TCP has an error compensation function, but the UDP has a feature of a high transfer speed correspondingly and also a broadcast function. The UDP emulator 16, similarly to the TCP emulator 15, carries out an operation of distributing packets to one of the UDPsec 16b which has a function of preventing data leakage and falsifying, that is, a function of encryption, integrity authentication, authentication or the like and an ordinarily protocol UDP 16a which may not have a function of such encryption, integrity authentication, authentication or the like.

As shown in FIG. 1, the protocol stack carrying out encryption processing according to the present invention includes the socket 17, the TCP emulator 15, the UDP emulator 16, the "TCPsec on CP" 15b, the "UDPsec on CP" 16b, the "TCP on CP" 15a, the "UDP on CP" 16a, the "ICMP on CP" 14a, the "IGMP on CP" 14b, the IP emulator 13, the "IP on CP" 13a and the "ARP on CP" 12 and, hereinafter, the protocol stack will be generically called TCP2 (see Patent Document 1).

In the TCP2 which plays a central role in the mail system of the present invention, CP (cracking-protection) is implemented in standard protocols of TCP, UDP, IP, IPsec, ICMP, IGMP and ARP, and respective stacked protocols can be protected from an attack based on the communication and an attack based on an application-program (Trojan Horse, falsifying of a program or unauthorized use of a qualified user). Also, the TCP emulator 15 is implemented in the TCP2 and the TCP emulator 15 is compatible for the Socket 17 in the session layer and the IP emulator 13 in the network layer, so that the TCP emulator 15 can be externally seen as a standard TCP. Actually, TCP and TCPsec are switched to be executed as a TCP2 function. TCPsec is an encryption and authentication function in the transport layer.

Also, the UDP emulator 16 is similarly implemented in TCP2 and the UDP emulator 16 is compatible with a standard UDP for the Socket 17 in the session layer and the IP emulator 13 in the network layer, so that the UDP emulator 16 can be externally seen as a standard UDP. Actually, UDP and UDPsec are switched to be executed as a TCP2 function. However, UDPsec is a function not used in the mail system according to the present invention, so that it will not be mentioned in the description hereinafter.

Next, the TCPsec 15b having a function of preventing "data leakage" which is a particularly important function in TCP2 will be described. A publicly known secret key (common key) encryption algorithm is used as an encryption and decryption method (algorithm and logic (logic)) for the TCPsec 15b.

Further, in addition to a cryptograph system such as called FEAL (Fast data Encipherment Algorithm), MISTY and AES (Advanced Encryption Standard) used as a cryptograph system of the TCPsec 15b in the mail system of the present invention, it is also possible to use a secret encryption and decryption algorithm created independently. Here, FEAL is a cryptograph system developed by Nippon Telegraph and Telephone Corporation (old name at that time) and is a secret-key cryptograph system which uses the same key for the encryption and the decryption. FEAL has an advantage that encryption and decryption are realized at a high speed as compared with DES (Data Encryption Standard: common key (secret key) encryption algorithm developed by IBM U.S.).

Next, for example, MISTY is similarly used as a cryptograph system for TCP2 and, similarly to IDEA, MISTY encrypts data by dividing it into blocks of 64 bits. The key length is 128 bits. The same program is used for encryption and decryption in MISTY, which is similar in DES or the like.

In this manner, various kinds of secret key encryption algorithms already known can be employed as a cryptograph system of the TCPsec 15b according to the present invention and moreover, it is also possible to utilize a secret key (common key) cryptograph system developed by a user independently.

Further, an authentication algorithm utilizing a public key or pre-shared secret such as MD5 (Message Digest 5), SHA1 (Secure Hash Algorithm 1) is used as an "authentication" and "integrity authentication" method for preventing so-called "masquerading" and "data falsifying" or the like. Also, it is possible to employ an original algorithm utilizing a one-way function in place of such a publicly known authentication algorithm.

MD5 is a hash function (one-way summary function) used for authentication and digital signature in which whether an original text is falsified or not on a halfway of a communication can be detected by generating a hash value of a fixed length based on the original text and by comparing the values at both ends on the communication path. The hash value is such a value as a quasi random number with which it is unable to reproduce the original text. In addition, it is difficult to create another message generating the same hash value.

SHA1 is also a hash function used for authentication, digital signature or the like in which falsifying of an original text on a halfway of a communication can be detected by generating a 160-bit hash value from the original text with a maximum length of $2^{64}$ or less bits and by comparing the values at both ends of the communication path. This authentication algorithm is employed also in IPsec representing conventional internet encryption communications.

It should be noted that those authentication algorithms are designed such that a secure key exchange can be carried out based on DH (Diffie-Hellman) public key distribution method, IKE (Internet Key Exchange) protocol (No. 500 of UDP) similar to IPsec or the like and furthermore, a schedule is determined by a protocol driver program (TCPsec 15b, UDPsec 16b or the like) so that encryption/integrity authentication algorithm (logic) itself and the key set/domain therefor will be changed periodically.

<Description of TCP2 Data Packet Structure>

Figure 2:
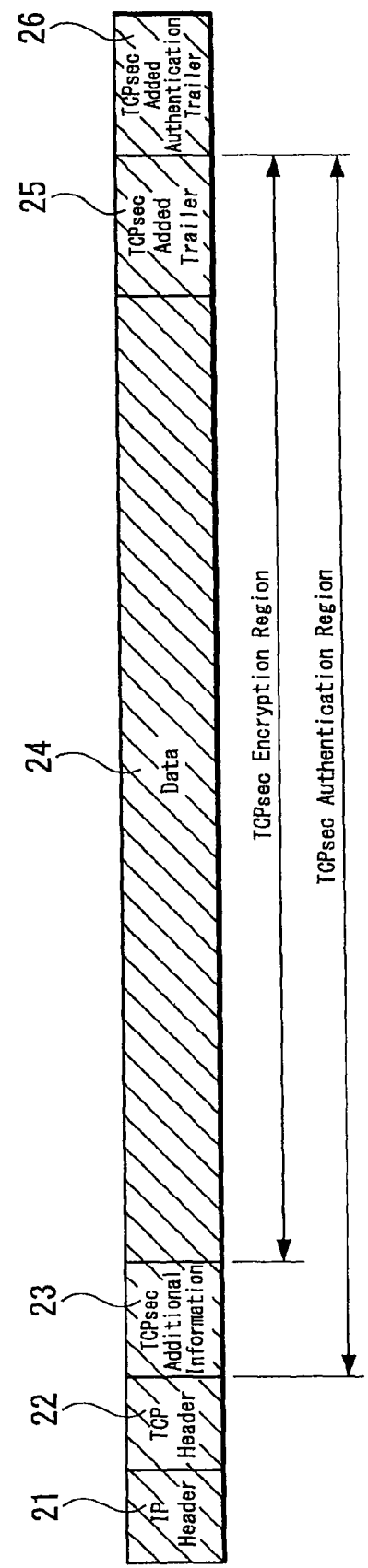
FIG. 2 is a diagram showing a structure of a message packet used for the mail system of the present invention.

Next, based on FIG. 2, a data packet structure used in the mail system of the present invention, an encrypted region thereof and an integrity authentication applied region thereof are described.

FIG. 2 shows a packet structure of TCPsec/IPsec, the encrypted region and integrity authentication applied region. As shown in FIG. 2, the packet structure includes an IP header 21, a TCP header 22 and a TCPsec additional information 23 immediately after the IP header 21, and further followed by application data 24. Then, a TCPsec added trailer 25 and TCPsec added authentication data 26 are arranged after the application data 24. The TCPsec added trailer 25 is the information for supporting cryptograph data on a data blank occurring in the block cryptograph, its blank length, the number of next header or the like.

Depending on the employed encryption/authentication algorithm, such information representing the feature of TCPsec can be dispersed into unused header field portions of TCPsec/IP or the like or can be omitted by an independent and prior arrangement (negotiation) which may not be calculated inversely or guessed from the individual packet. Also, by constituting the TCPsec/IP packet as shown in FIG. 2 using a protocol field which may not use TCP and IP corresponding to a layer above the IP layer, the packet length can easily be reduced as compared to an IPsec packet in which only a lower-layer IP is focused. It should be noted that the encrypted region here includes the application data 24 and the TCPsec added trailer 25 as shown in the drawing, and the authentication region includes the encrypted region and the TCPsec additional information 26 added thereto.

<Description of Function Block Diagram of TCP2 Mail System>

Next, a first example of a mail system using TCP2 of the present invention is described with reference to the drawings.

Figure 3:
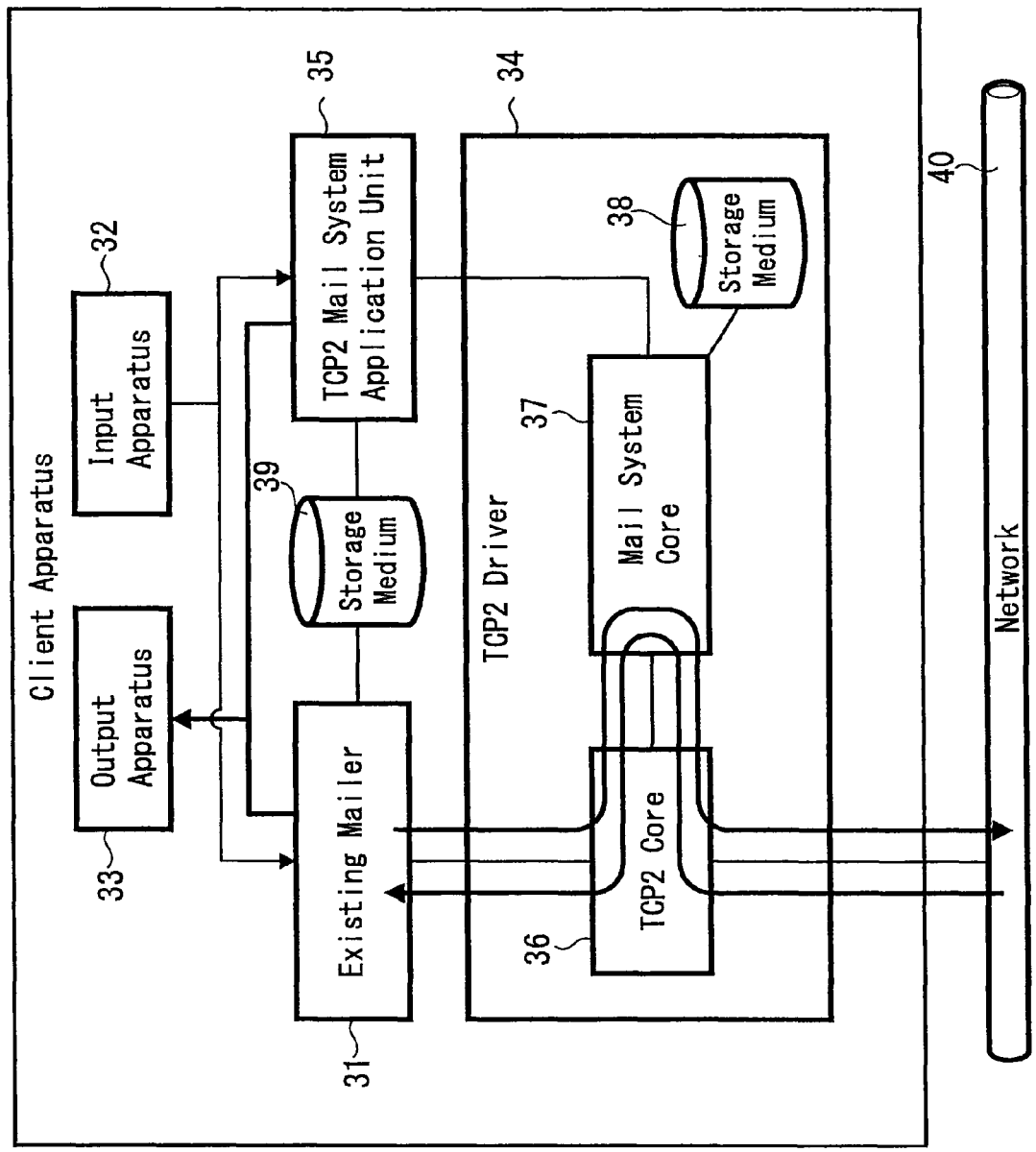
FIG. 3 is a block diagram of a TCP2 mail system in a client apparatus of the present invention.

FIG. 3 is a block diagram of an example of a client apparatus used in the mail system of the present invention. A client apparatus A (or B) includes a TCP2 driver 34 and TCP2 mail system application unit 35 other than an existing mailer 31, an input apparatus 32 and an output apparatus 33. Also, the client apparatus includes a storage medium 39 for saving a received mail.

Figure 4:
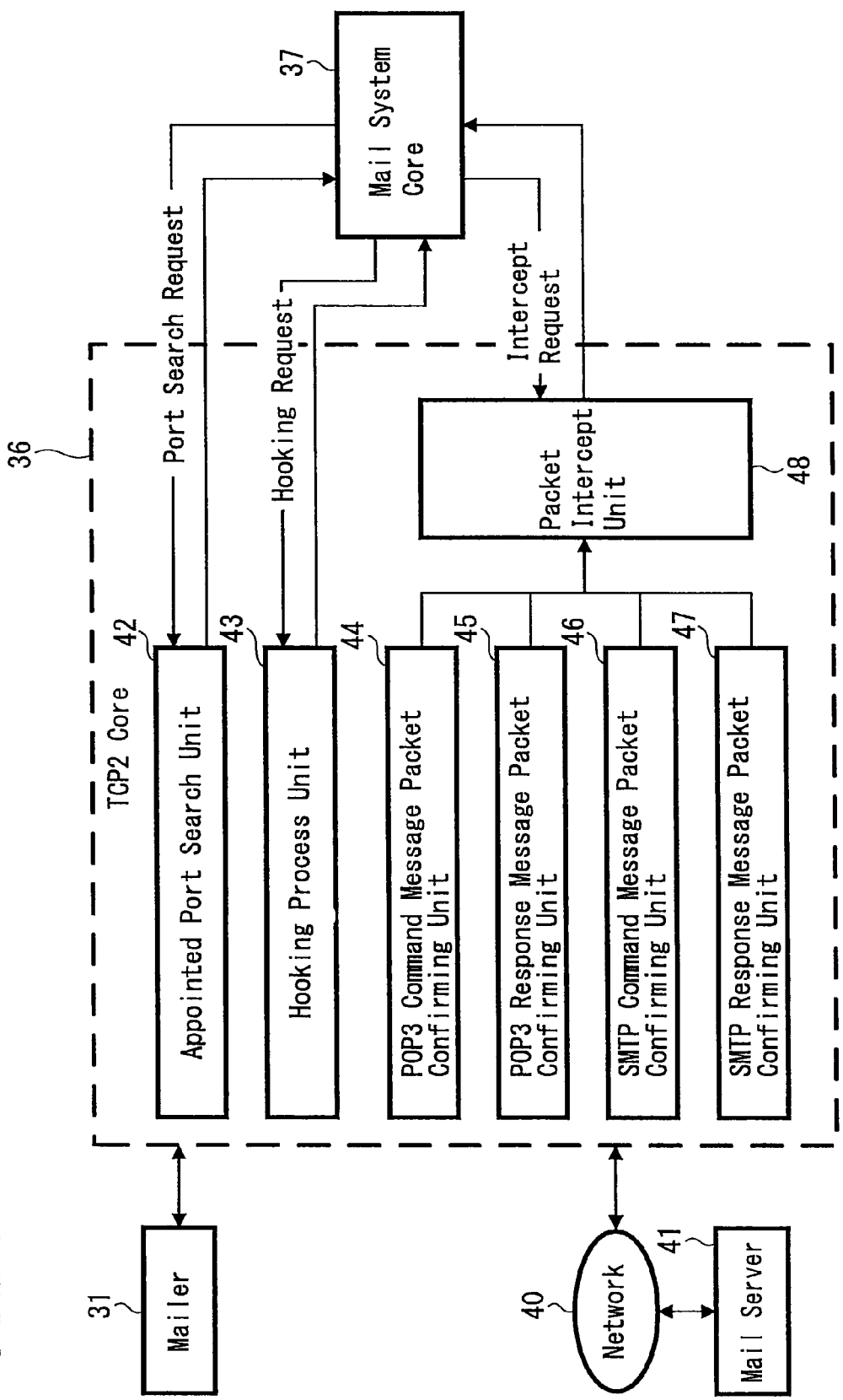
FIG. 4 is a block diagram for explaining an outline of a TCP2 core which is a component of a mail system of the present invention.
Figure 5:
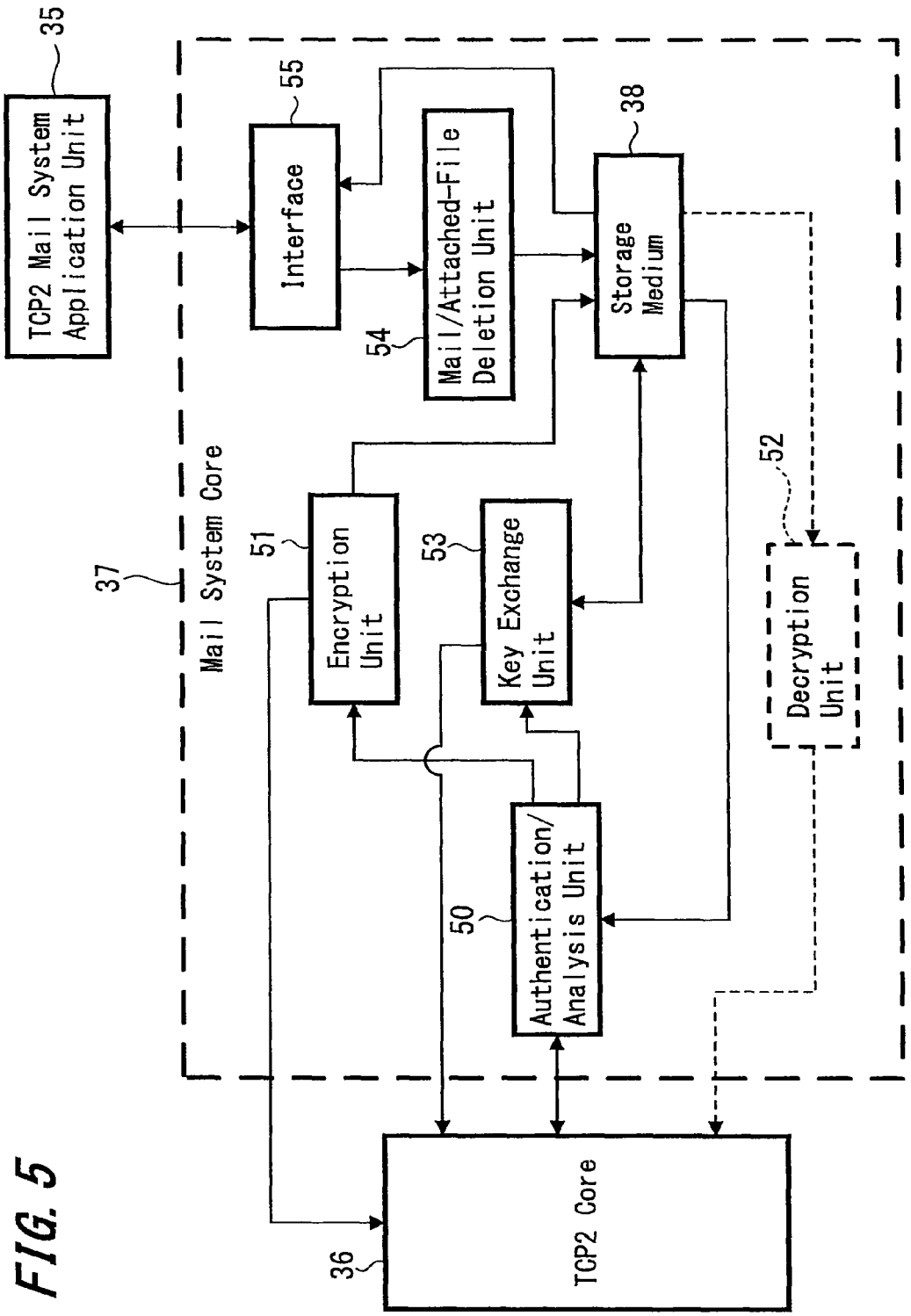
FIG. 5 is a block diagram for explaining an outline of a mail system core which is a component of a mail system of the present invention.

The TCP2 driver 34 includes a TCP2 core 36 described in FIG. 4, a mail system core 37 and a storage medium 38 described in FIG. 5. The storage medium 38 is a storage medium different from the storage medium 39 which the client apparatus A usually have and is a storage medium which stores various kinds of information described later in a state of being encrypted by a secret key which the mail system core has.

Here, a mail server not shown in the figure and other client terminals (for example, client apparatus B) are connected to a network 40 to which the client apparatus A is connected, and the client apparatus A and the client apparatus B carry out mail exchange through a mail server 41 (see FIG. 4) connected to the network 40.

Next, the operation of the client apparatus A shown in FIG. 3 is described briefly. It will be described in detail in FIGS. 4 to 6.

First, encrypted mail data transmitted from the mail server through the network 40 is transmitted to the TCP2 core 36 of the TCP2 driver 34 mounted in the client apparatus A. Subsequently, after confirming that the data is POP3 packet in the TCP2 core 36, it is transmitted to the mail system core 37 and transmitted to the existing mailer 31 after predetermined processing is performed.

Also, the mail system core 37 is connected to the TCP2 mail system application unit 35 and a list of the received mails are displayed on the output apparatus 33 through the TCP2 mail application unit 35 (see FIG. 7). The user of the client apparatus A looks at the display result, determines whether receiving or discarding a mail, and inputs the determination result from the input apparatus 32. The output of the input apparatus 32 is transmitted to the mail system core 37 through the TCP2 mail system application unit 35 and here, deletion of an unjustified mail is executed.

On the other hand, an e-mail transmitted from the mailer 31 of the client apparatus A is confirmed in the TCP2 core 36 that the mail is of the SMTP packet and thereafter, it is transmitted to the mail system core 37. Subsequently, the mail is encrypted in the mail system core 37 and transmitted to the mail server 41, which is connected to the network 40, through the TCP2 core 36 (see FIG. 4). Note that on an occasion of user registration or key exchange described in FIGS. 8 to 15 the storage medium 38 stores POP3 IP address and port number, SMTP IP address and port number, user ID and password, e-mail addresses of the receiver and the sender, and key information in the encrypted state. Further, although depending on the TCP2 mounting mode, the mail message can also be stored.

Figure 6:
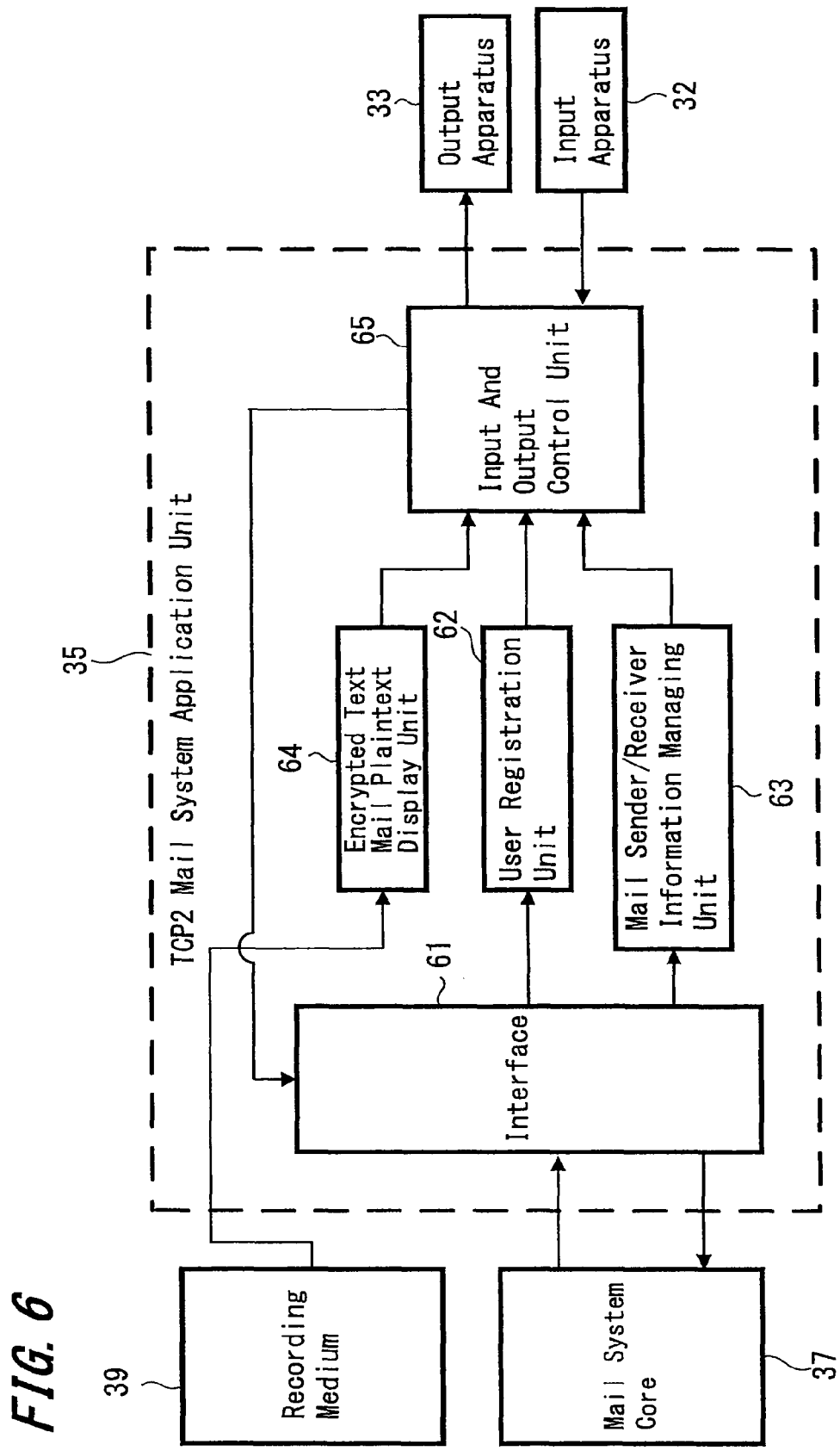
FIG. 6 is a block diagram for explaining an outline of a TCP2 mail system application unit which is a component of a mail system of the present invention.

An outline configuration of an example of a mail system of the present invention has been described above, and detailed description thereof will be given using block diagrams of FIGS. 4 to 6 and flowcharts of FIGS. 8 to 20.

FIG. 4 is a function block diagram for explaining in detail the TCP2 core 36 which is a component of the TCP2 driver 34. The same reference numerals are given to portions corresponding to those in FIG. 3.

As shown in FIG. 4, TCP2 core 36 includes a specified port search unit 42 receiving a port search request from the mail system core 37 and searching the specified port and a hooking process unit 43 likewise receiving a hooking request from the mail system core 37 and hooking the packet in conformity with the request.

The TCP2 core 36 includes a POP3 command message packet confirming unit 44 receiving a POP3 command message packet from the mailer 31 of the client apparatus A and confirming that it is the POP3 command message packet; a response message confirming unit 45 confirming that the message is from the mail server 41 connected to the network 40; an SMTP command message packet confirming unit 46 receiving a SMTP command message packet from the mailer 31 of the client apparatus A and confirming that it is the SMTP command message packet; and a response message confirming unit 47 confirming that the message is from the mail server 41 connected to the network 40. Further, the TCP2 core 36 includes a packet intercept unit 48 connecting POP3/SMTP message confirming units 44 to 47 and the mail system core 37.

The hooking process unit 43 is a unit configured to carry out processing of catching a packet for which a hooking request (a request for catching a predetermined packet when receiving it) is made by the mail system core 37. More specifically, the hooking process unit 43 cooperates with the POP3 command message packet confirming unit 44 and the SMTP command message confirming unit 46 and, when a packet including the IP address and the port number for which a hooking request is made beforehand is confirmed, catches and transmits the packet to the mail system core 37. Also, in the case where recipient declaration data, key exchange fixed-form data or the like for which a hooking request is made beforehand by the mail system core 37 are confirmed in the POP3 command message packet confirming unit 44 and the SMTP command message confirming unit 46, these are caught by the hooking process unit 43 and transmitted to the mail system core 37. When the POP3 response message packet confirming unit 45 or SMTP response message packet confirming unit 47 confirms each message packet similarly, the hooking process unit 43 catches the message packet and the result thereof is transmitted to the mail system core 37 via the packet intercept unit 48. The configuration and the operation of the TCP2 core 36 have been thus described.

Next, the configuration and the operation of the mail system core 37 will be described based on FIG. 5. The same reference numerals are given to the same configurations of those in FIG. 3 and FIG. 4, and the description thereof will be omitted.

The mail system core 37 includes an authentication/analysis unit 50 carrying out authentication of the user ID and the password included in various kinds of command message packet transmitted from the TCP2 core 36 and analysis of various kinds of command message; an encryption unit 51 encrypting the POP3 IP address and port number, the SMTP IP address and port number, the user ID and password, the e-mail addresses of the receiver and the sender, the key information or the like, and the title, the message body and the attached file of the plaintext mail which are included in the command message packet analyzed by the authentication/analysis unit 50; a key exchange unit 53 carrying out key exchange between client apparatuses; and the storage medium 38 storing, as mentioned above, the POP3 IP address and port number, the SMTP IP address and port number, the user ID and password, the e-mail addresses of the receiver and the sender, the key information and the like in the encrypted state. Also, the mail system core 37 includes an interface unit 55 connecting the mail system core 37 to the TCP2 mail system application unit 35; a mail/attached file deletion unit 54 carrying out the deletion of the mail and the attached file based on the displayed list of received mails (see FIG. 7); and a decryption unit 52 decrypting the information stored in the storage medium 38 in the encrypted state.

As mentioned above, the TCP2 core 36 catches the command message packets from the mailer 31 of the terminal and from the mail server 41 based on the hooking request from the mail system core 37. The command message packet caught by the TCP2 core 36 is transmitted to the authentication/analysis unit 50 of the mail system core 37.

The encryption unit 51 of the mail system core 37 encrypts the title, the message body and the attached file of the mail out of the command message packets analyzed by the authentication/analysis unit 50 and transmits them to the mail server 41 through the TCP2 core 36. It should be noted that the command message packets other than the title, the message body and the attached file of the mail are transmitted without being encrypted by the encryption unit 51 to the mail server 41 through the TCP2 core 36.

The decryption unit 52 is means for decrypting various kinds of information including the mail information stored in the storage medium 38 and for transmitting them to the mailer 31 through the TCP2 core 36 if it is necessary. Also, the key exchange unit 53 is means for carrying out key exchange between the terminal (client apparatus A) and another terminal (client apparatus B) connected to the network 40. In the encryption unit 51 and the decryption unit 52, the title, the message body or the attached file of the mail is encrypted or decrypted.

Also, the mail system core 37 includes the mail/attached file or the like deletion unit 54 which allows an unjustified mail to be deleted. The mail/attached file deletion unit 54 is connected to the TCP2 mail application unit 35 (see FIG. 3, FIG. 6) through the interface 55. The operator of the client apparatus A confirms the display data shown in FIG. 7 which are displayed on the output apparatus (display apparatus) 33 and determines receiving mails and deleting mails. Deleting mails (or attached files) are transmitted to the mail-attached file deletion unit 54 of the mail system core 37 in FIG. 5 by clicking a deletion button, and are deleted. Accordingly, an unjustified mail can be deleted without supplying it to the mailer 31 of the client apparatus A.

Next, the configuration and the operation of the TCP2 mail system application unit 35 will be described based on FIG. 6. The TCP2 mail system application unit 35 is software connecting the mail system core 37 and the input apparatus 33 and output apparatus 32 and is configured to have an interface 61, a user registration unit 62, a mail sender/receiver information managing unit 63, a mail display unit 64 and an input and output control unit 65. Then, user registration is carried out in the mail system core 37 from the input and output control unit 65 through the interface 61 and when the user registration is completed, the user registration completion notice is transmitted from the mail system core 37 to the user registration unit 62 through the interface 61. Then, a fact that the user registration was completed is displayed in the output apparatus 33.

Further, as described above, a received mail list screen as shown in FIG. 7 is displayed on the output apparatus 33. That is to say, when mail data are transmitted from the POP3 server to the mail system core 37, the reception of the encrypted mail, the mail with the attached file and the HTML mail are put on hold by the mail system core 37.

Then, the received mails are displayed as a list on the output apparatus 33 and the TCP2 mail application unit 3 selects "reception" or "discard" of the mail. More specifically, in the case of an encrypted mail, after a "reception" button is pushed down and the person is authenticated, the encrypted mail can be received by the existing mailer 31.

Also, in the case of a mail with an attached file or an HTML mail, after confirming, to the sender, whether or not the sender transmitted it intentionally, the "reception" button will be pushed down and it becomes possible to receive it by the existing mailer 31. In the course of the confirmation with the sender and in the case where the sender may not recall the transmission at all, the "discard" button will be pushed down and it is possible to discard the mail.

Also, in the TCP2 mail application unit 35, the mail display unit 64 allows the encrypted mail received by the existing mailer and stored in the storage medium 39 to be a plaintext and displayed on the output apparatus 33.

<Description of a Flow of User Registration>

Figure 8:
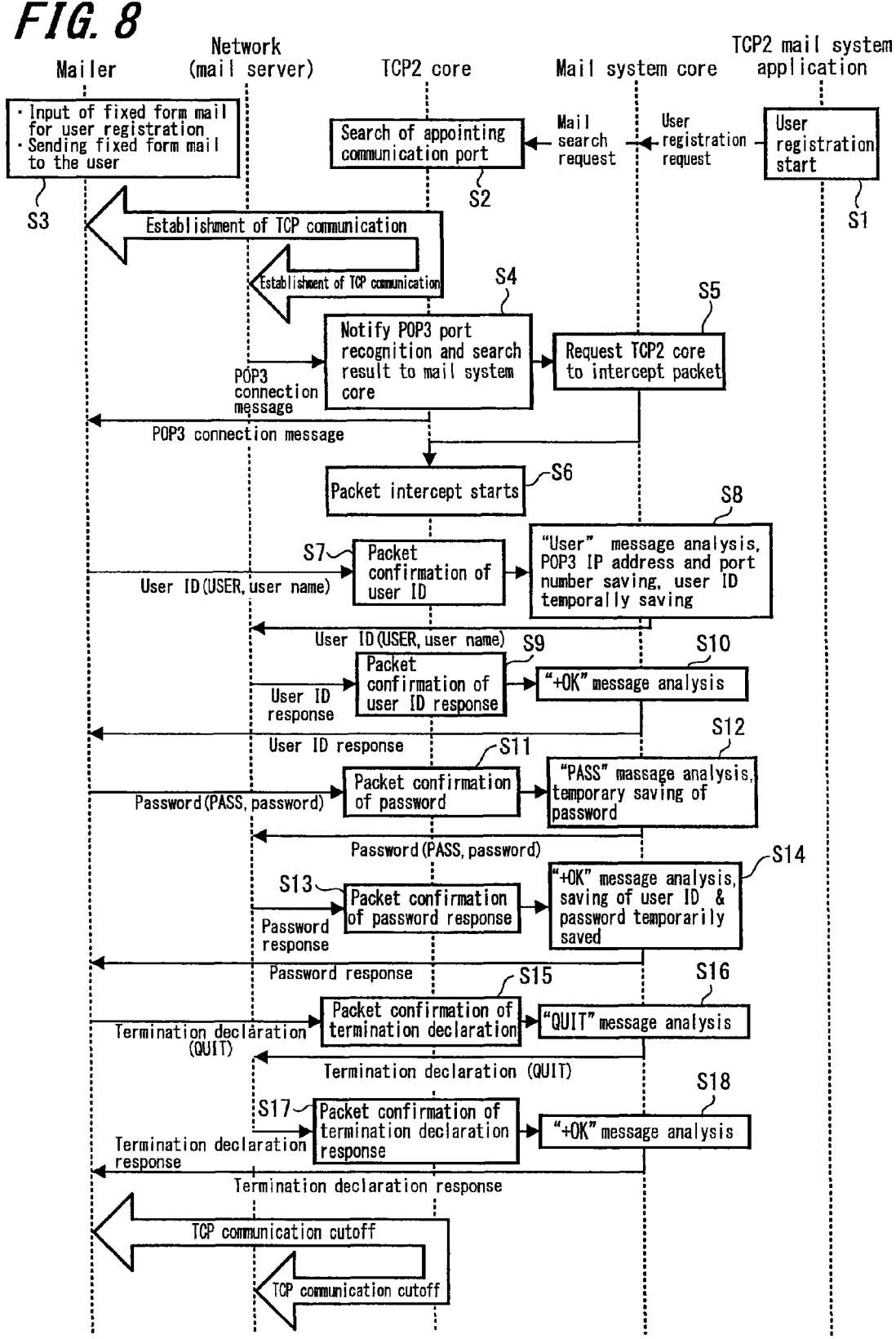
FIG. 8 is a portion of a flow chart showing a flow of user registration in a mail system of the present invention.
Figure 9:
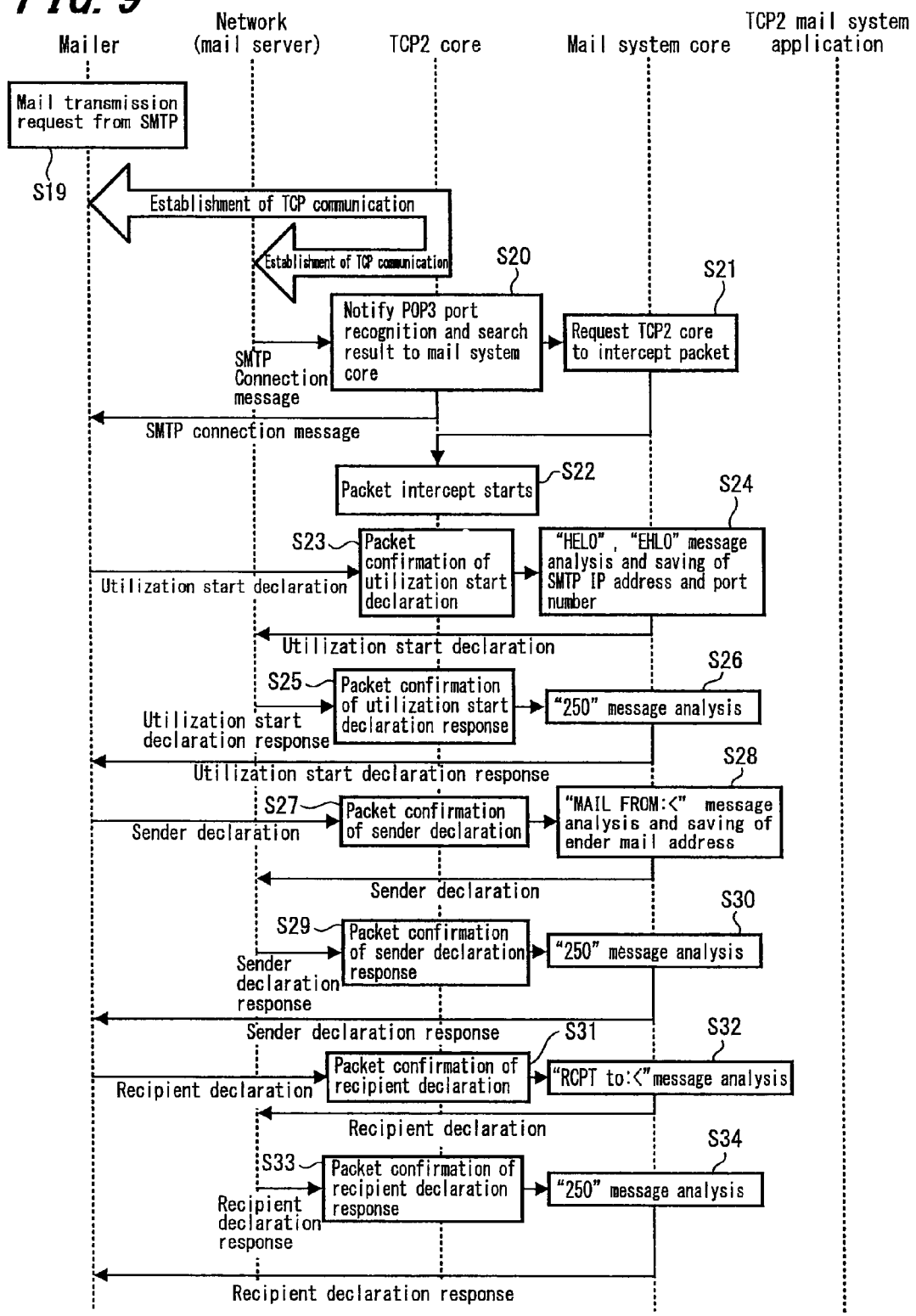
FIG. 9 is a portion of a flow chart showing a flow of user registration in a mail system of the present invention.
Figure 10:
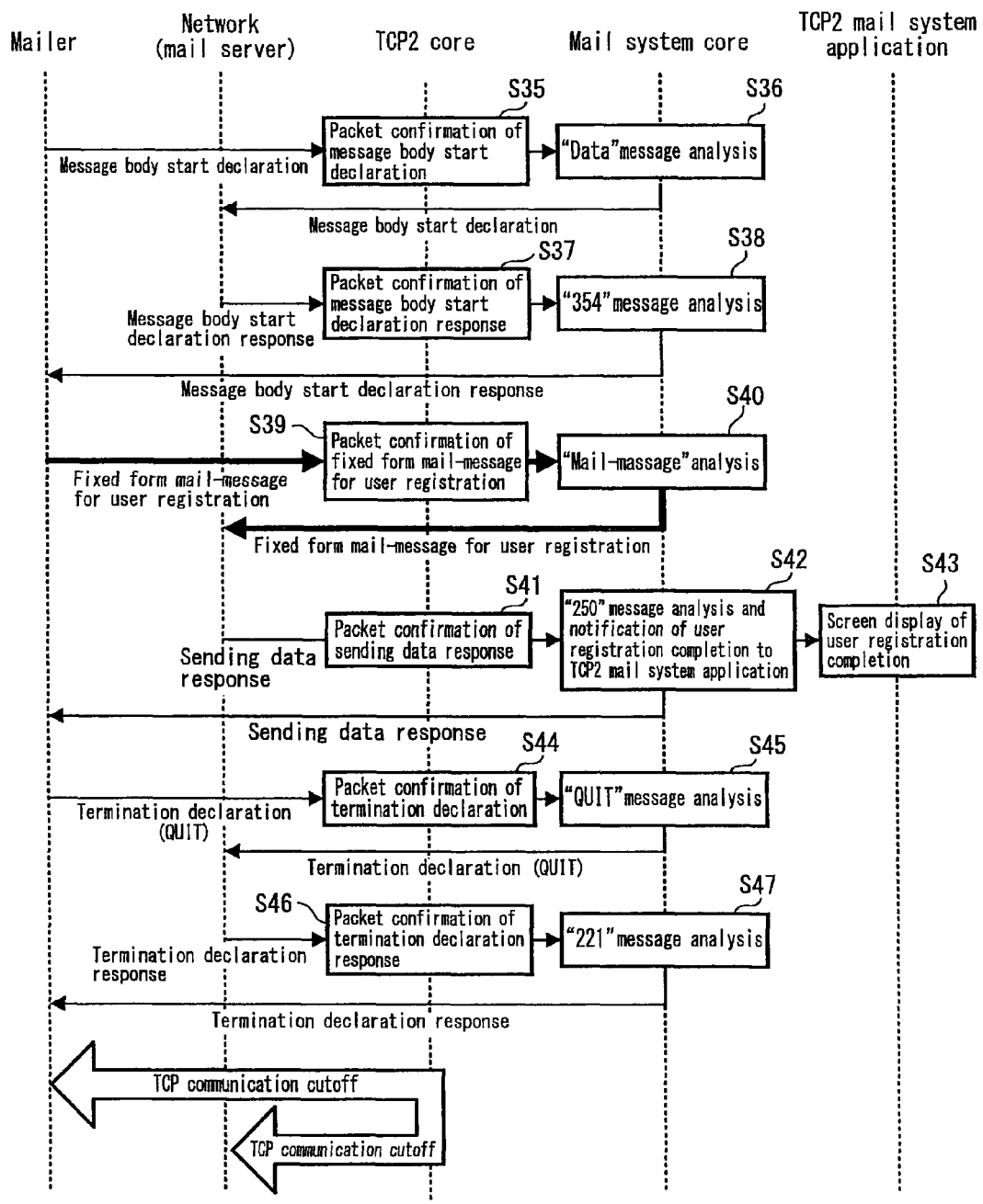
FIG. 10 is a portion of a flow chart showing a flow of user registration in a mail system of the present invention.

Next, a flow of user registration will be described in detail based on flowcharts of FIG. 8 to FIG. 10.

In the present invention, it is necessary to use "POP before SMTP" system in the mail transmission.

The "POP before SMTP" system means a mail transmission system in which POP is executed necessarily before utilizing SMTP.

The SMTP protocol (in standard mode) used in the mail transmission has no mechanisms for user authentication and therefore, there is possibility that any user could send a mail.

For this reason, for example, a SPAM mail and a mail such as virus could be transmitted. One of the methods devised for preventing unjustified utilization of such a SMTP server is the "POP before SMTP".

In the POP protocol for receiving a mail, user authentication is carried out in the first step of the connection thereof.

Consequently, if the user authentication according to POP is made to be received necessarily before the transmission by the SMTP protocol, it is possible to restrict the users using the SMTP server, so that it is possible to prevent an unjustified mail transmission.

The system utilizing the SMTP server with such a mechanisms is called "POP before SMTP".

Typically, the access from the same IP address to the SMTP server will be allowed only for an interval of around several minutes to several tens of minutes after the POP operation is carried out, so that a user needs to send a mail during this period.

In the case in which the SMTP server employs "POP before SMTP" system, the user must carry out receiving operation once before transmitting a mail, but depending on the mail-software, this operation is carried out automatically.

Also, when the mail-software may not support it, the transmission may be carried out after carrying out manually the receiving operation once.

Here, a user carries out transmission according to this method regardless of the SMTP server which employs the "POP before SMTP" system or not.

First, when registering a user in the TCP2 mail system, the user registration starts from a TCP2 mail system application unit (step S1). More specifically, the TCP2 mail system application unit 35 requests the mail system core 37 in the TCP2 driver 34 to register a user. The mail system core 37 receiving the user registration request sends mail search request to the TCP2 core 36 in the TCP2 driver.

When receiving the mail search request from the mail system core 37, the TCP2 core 36 searches an appointing communication port (step S2).

After the operation, a fixed-form mail for the user registration is transmitted from the existing mailer 31 to the user (step S3). Here, as mentioned above, connection to POP3 is carried out before requesting a mail transmission from SMTP. In this step, the TCP communication is established between the existing mailer 31 and the mail server 41 connected to the network 40 (see FIG. 4) through the TCP2 core.

Then, the TCP2 core 36 receives a POP3 connection message from the network 40 and after recognizing that it is a POP3 port, the searched port is notified to the mail system core 37 (step S4). For example, if the appointing communication port is a packet of SMTP (example: 25 port) or POP3 (example: 110 port), the searched port is notified to the mail system core 37. Also, at that time, the TCP2 core 36 transfers a POP3 connection message to the existing mailer 31.

The mail system core 37 receives the search result from the TCP2 core 36 and requests the TCP2 core 36 to receive (intercept) the packet (step S5). Upon receiving the intercept request from the mail system core 37, the TCP2 core 36 starts the intercept of the packet (step S6).

Subsequently, user ID is transmitted from the existing mailer 31 to the TCP2 core 36, and the TCP2 core 36 confirms the packet of the user ID (step S7) and the "USER" message from the mailer is transmitted to the mail system core 37. "USER" is a fundamental command of POP3 issued in the case of connecting the client to the server.

The mail system core 37 analyzes the "USER" message from the TCP2 core 36, stores POP3 IP address and port number in the storage medium 38 (see FIG. 3, FIG. 5), and saves the user ID therein temporarily (step S8). Here, the user ID is saved temporarily, because it is in a step where authentication has not been attained yet by password confirmation or the like. Then, the user ID is transmitted to the mail server 41 (see FIG. 4) connected to the network 40.

A response to the user ID is returned from the mail server 41 to the TCP2 core 36, and the TCP2 core 36 confirms the packet of the user ID response message and sends a "+OK" message which is the result thereof to the mail system core 37 (step S9). "+OK" message is a message telling "User recognized, send password" in the mail server 41. The mail system core 37 analyzes the "+OK" message and transfers a user ID response from the mail server 41 to the mailer 31 (step S10).

Next, such a case in which the mailer 31 sends a password message to the mail server 41 will be described. First, the password message transmitted from the mailer 31 is confirmed in the TCP2 core 36 and the packet of the confirmed password message is transmitted to the mail system core 37 (step S11). The mail system core 37 receives the "PASS" message from the TCP2 core 36 and analyzes this. As the result of analysis, the password is saved temporarily in the storage medium 38 (temporary saving) and sends the password to the mail server 41 connected to the network 40 (step S12).

Next, when a password response message is returned from the mail server 41 to the client apparatus A, the packet of the password response message is confirmed by the TCP2 core 36 and the packet of the password response message is transmitted to the mail system core 37 (step S13). The mail system core 37 receives the packet of the password response message and analyzes the message. More specifically, "+OK" message indicating that the password was confirmed is analyzed and the user ID and the password saved in the storage medium 38 temporarily are stored in the storage medium 38 formally. Thus, the user authentication is terminated. Then, after terminating the storage of the user ID and the password, the password response from the mail server 41 is transmitted to the mailer 31.

Upon receiving the password response, the mailer 31 sends termination declaration (QUIT) reporting that the connection is released to the TCP2 core 36, and the TCP2 core 36 reports that the termination declaration was confirmed to the mail system core 37 (step S15). The mail system core 37 analyzes the "QUIT" message and sends the termination declaration (QUIT) to the mail server 41 connected to the network 40 (step S16).

Thereafter, a termination declaration response is returned from the mail server 41 to the TCP2 core 36 and therefore the TCP2 core 36 confirms the packet of the termination declaration response (step S17) and sends the result to the mail system core 37. The mail system core 37 analyzes the "+OK" message from the TCP2 core 36 and transfers a termination declaration response to the mailer 31 (step S18). Accordingly, TCP communication cutoffs between the TCP2 core 36 and the mailer 31 and between the TCP2 core 36 and the mail server 41 connected to the network 40 is completed.

Next, a second step of the flow of the user registration will be described based on FIG. 9.

The second step starts from a mail transmission request from SMTP of the mailer 31 to the mail server 41 connected to the network 40 (step S19). Accordingly, TCP communication is established between the mailer 31 and the mail server 41 through the TCP2 core.

After the TCP communication is established, an SMTP connection message is transmitted from the mail server 41 to the TCP2 core 36, and the TCP2 core 36 receives an SMTP response code "220", recognizes that it is a SMTP port and notifies the search result to the mail system core 37 (step S20). SMTP response code "220" is notification that preparation of the connection between the mail server and the client apparatus has been completed.

Subsequently, the mail system core 37 requests the TCP2 core 36 to receive (intercept) packet (step S21), and the TCP2 core 36 which received the request starts the packet reception (step S22).

Next, a utilization start declaration is issued from the mailer 31 of the client apparatus. The utilization start declaration is a message telling "From now, a mail is transmitted." from the client apparatus to the server. The TCP2 core 36 confirms the packet of the utilization start declaration message (step S23) and sends it to the mail system core 37 as "HELO", "EHLO" message.

The mail system core 37 analyzes the "HELO", "EHLO" message and saves the SMTP IP address and port number in the storage medium 38 (step S24). Then, the utilization start declaration is transmitted to the mail server 41 connected to the network 40. A utilization start declaration response thereto is issued from the mail server 41 and this is confirmed in the TCP2 core 36 (step S25). The response code of the utilization start declaration is denoted by the number "250". The response code "250" is referred as to "Requested mail action okay, completed".

The mail system core 37 analyzes the "250" message and sends the utilization start declaration response transmitted from the mail server 41 to the mailer 31 (step S26).

Subsequently, a sender declaration is transmitted from the mailer 31. The TCP2 core 36 confirms the packet of the sender declaration and sends it to the mail system core 37 (step S27). The sender declaration message is a message referred as to "MAIL FROM:<" and is a message informing the sender. The mail system core 37 analyzes this message, stores the e-mail address of the sender in the storage medium 38 (step S28), and sends the sender declaration to the mail server 41.

The mail server 41 receives this and issues a sender declaration response. The TCP2 core 36 confirms the packet of this sender declaration response and sends this response code "250" to the mail system core 37 (step S29). The mail system core 37 analyzes the "250" response code and thereafter sends the received sender declaration response to the mailer 31 of the client apparatus (step S30).

Subsequently, the mailer 31 sends a recipient declaration message. The recipient declaration message is a message to report "Please send the e-mail to this e-mail address." to the mail server 41 and is expressed as a reference numeral referred to as "RCPT TO:<". The TCP2 core 36 confirms this recipient declaration message (step S31) and sends this to the mail system core 37. The mail system core 37 analyzes the "RCPT TO:<" message and sends it to the mail server 41 (step S32).

Upon receiving this, the mail server 41 returns a recipient declaration response to the TCP2 core 36, and the TCP2 core 36 confirms this recipient declaration response and sends it as the response code "250" to the mail system core 37 (step S33). The mail system core 37 analyzes the recipient declaration response and transfers it to the mailer 31 of the client terminal (step S34).

Subsequently, a third step of the flow of the user registration shown in FIG. 10 will be described. More specifically, the mailer 31 of the client apparatus, which receives the recipient declaration response, sends a message body start declaration. The TCP2 core 36 confirms the packet of the message body start declaration and supplies it as a "DATA" message to the mail system core 37 (step S35). Here, "DATA" is an SMTP command meaning transmission of the message body. The mail system core 37 analyzes the "DATA" message and sends this message body start declaration to the mail server 41 (step S36).

Upon receiving the message body start declaration, the mail server 41 sends a message body start declaration response to the client apparatus. Then, the TCP2 core 36 of the client apparatus confirms the packet of the message body start declaration response and sends this as a "354" message to the mail system core 37 (step S37). Here, the response code "354" is an SMTP response code indicating mail input start.

The mail system core 37 analyzes the "354" message and sends the message body start declaration response transmitted from the mail server 41 to the mailer 31 of the terminal (step S38).

Receiving this, the mailer 31 sends a user registration fixed-form mail message to the mail server 41. At that time, the TCP2 core 36 confirms the packet of the user registration fixed-form mail message and sends this to the mail system core 37 (step S39).

The mail system core 37 receives the packet of the user registration fixed-form mail message and carries out analysis of the user registration fixed-form mail message (step S40). Then, the user registration fixed-form mail message is transmitted to the mail server 41.

Next, a transmission data response message is transmitted from the mail server 41 to the client apparatus. The TCP2 core 36 confirms the packet of the transmission data response message and sends the packet of the transmission data response message to the mail system core 37 (step S41). The mail system core 37 receives the packet of the transmission data response message and analyzes the message. More specifically, the SMTP response code "250 OK" message is analyzed, completion of the user registration is notified to the TCP2 mail system application unit 35, and the transmission data response is transmitted to the mailer 31 of the terminal (step S42). Upon receiving the notification from the mail system core 37, the TCP2 mail system application unit 35 displays a fact that the user registration was completed on the display screen of the output apparatus 33 (step S43).

The mailer 31 receiving the transmission data response from the mail server 41 sends a termination declaration message "QUIT" to the mail server 41. The TCP2 core 36 receiving the termination declaration message confirms the packet (step S44) and sends it as a "QUIT" message to the mail system core 37. The mail system core 37 analyzes the "QUIT" message and sends the termination declaration to the mail server 41 (step S45). The mail server 41 issues a termination declaration response with respect to the termination declaration and sends it to the client apparatus. Then, the TCP2 core 36 of the client apparatus confirms the packet of the received termination declaration response and sends it as the SMTP response code "221" message to the mail system core 37 (step S46). The "221" message is a SMTP response code telling that the connection is shut down. The mail system core 37 analyzes the "221" message and sends the termination declaration response thereof to the mailer 31 of the terminal. Accordingly, the user registration flow is all completed and the TCP communication of the mailer 31 in the client apparatus and the mail server 41 is cut off.

<Description of a Flow on the Key Exchange Transmission Side>

Figure 11:
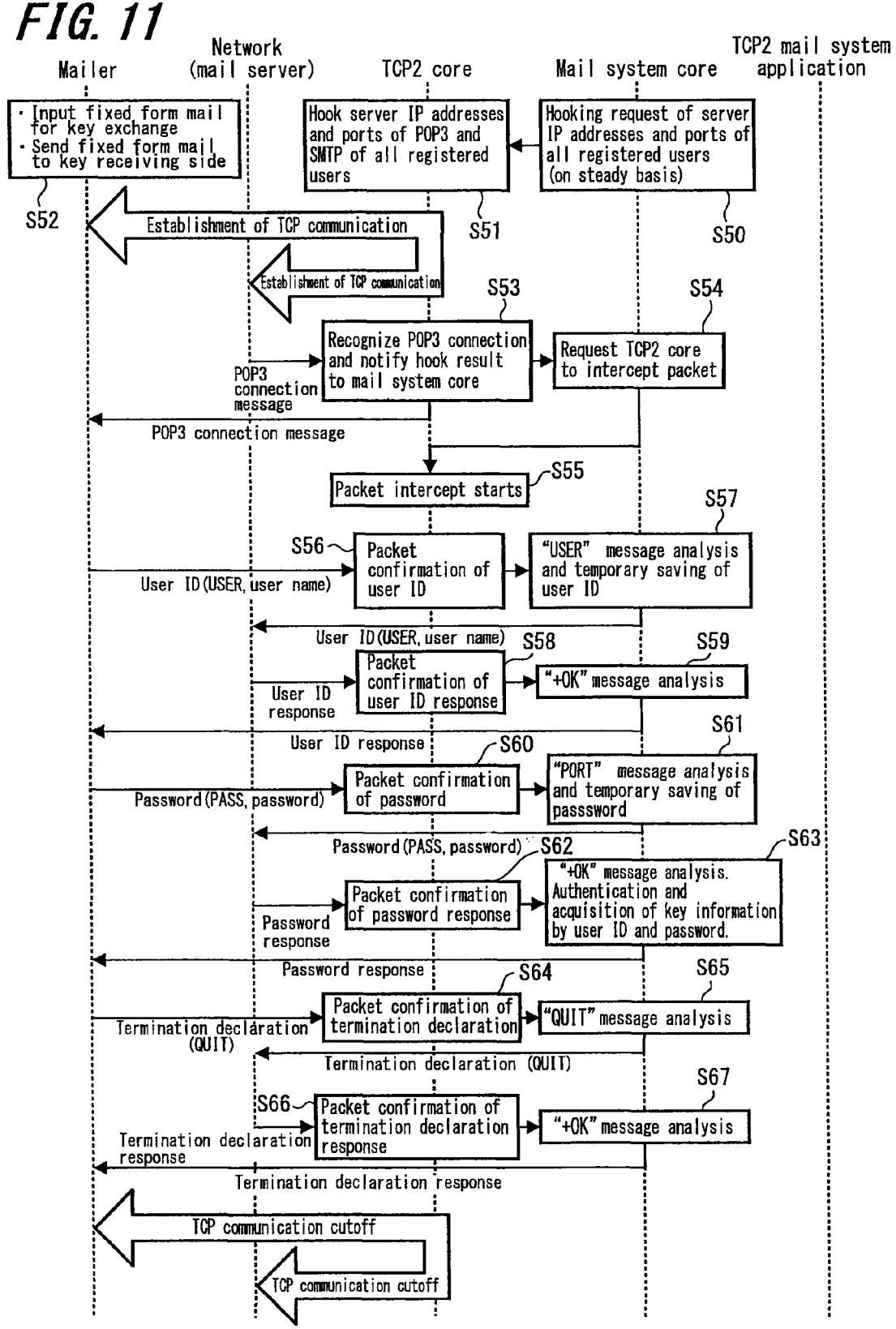
FIG. 11 is a portion of a flow chart showing a flow of the key exchange transmission side in a mail system of the present invention.
Figure 12:
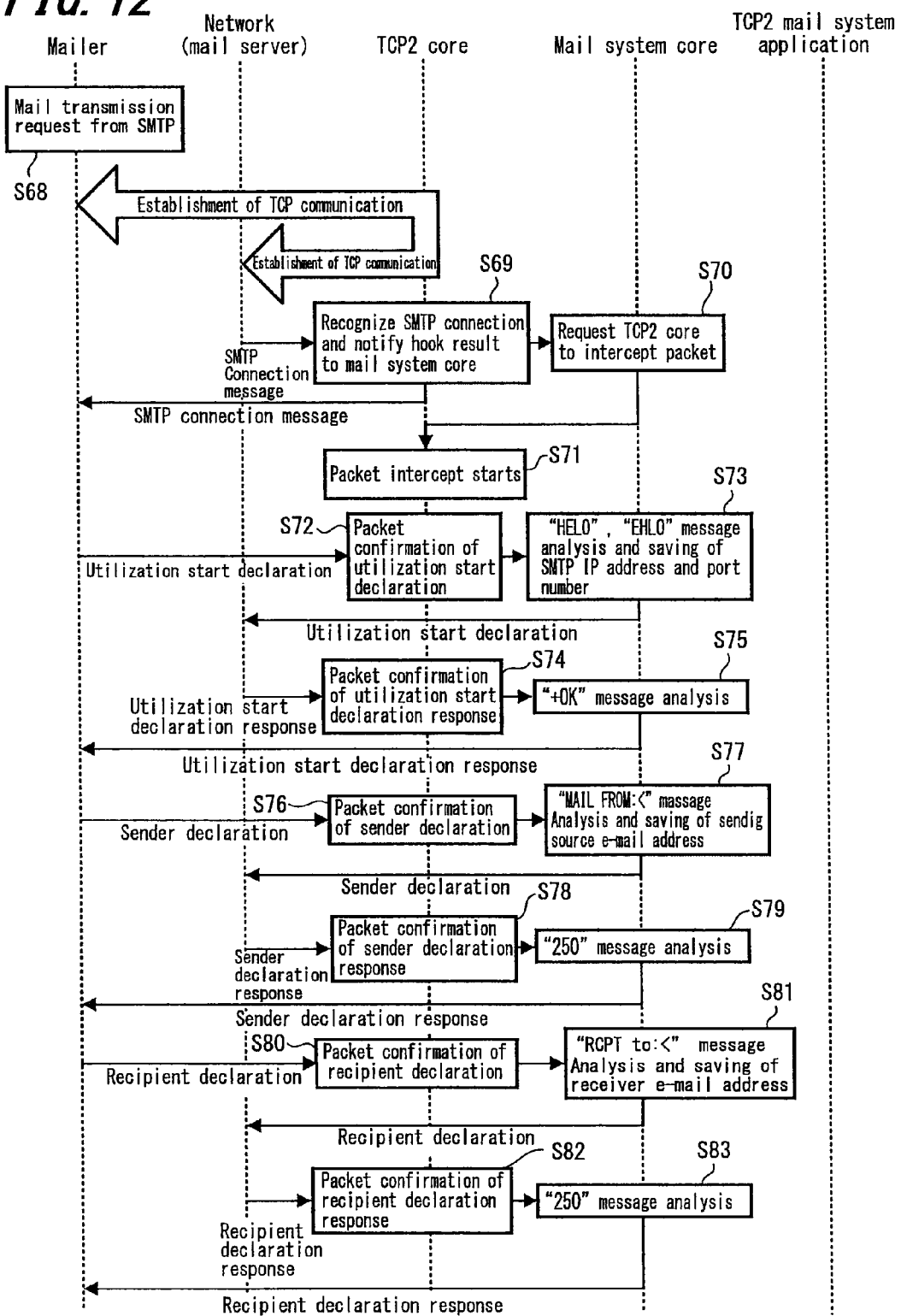
FIG. 12 is a portion of a flow chart showing a flow of the key exchange transmission side in a mail system of the present invention.
Figure 13:
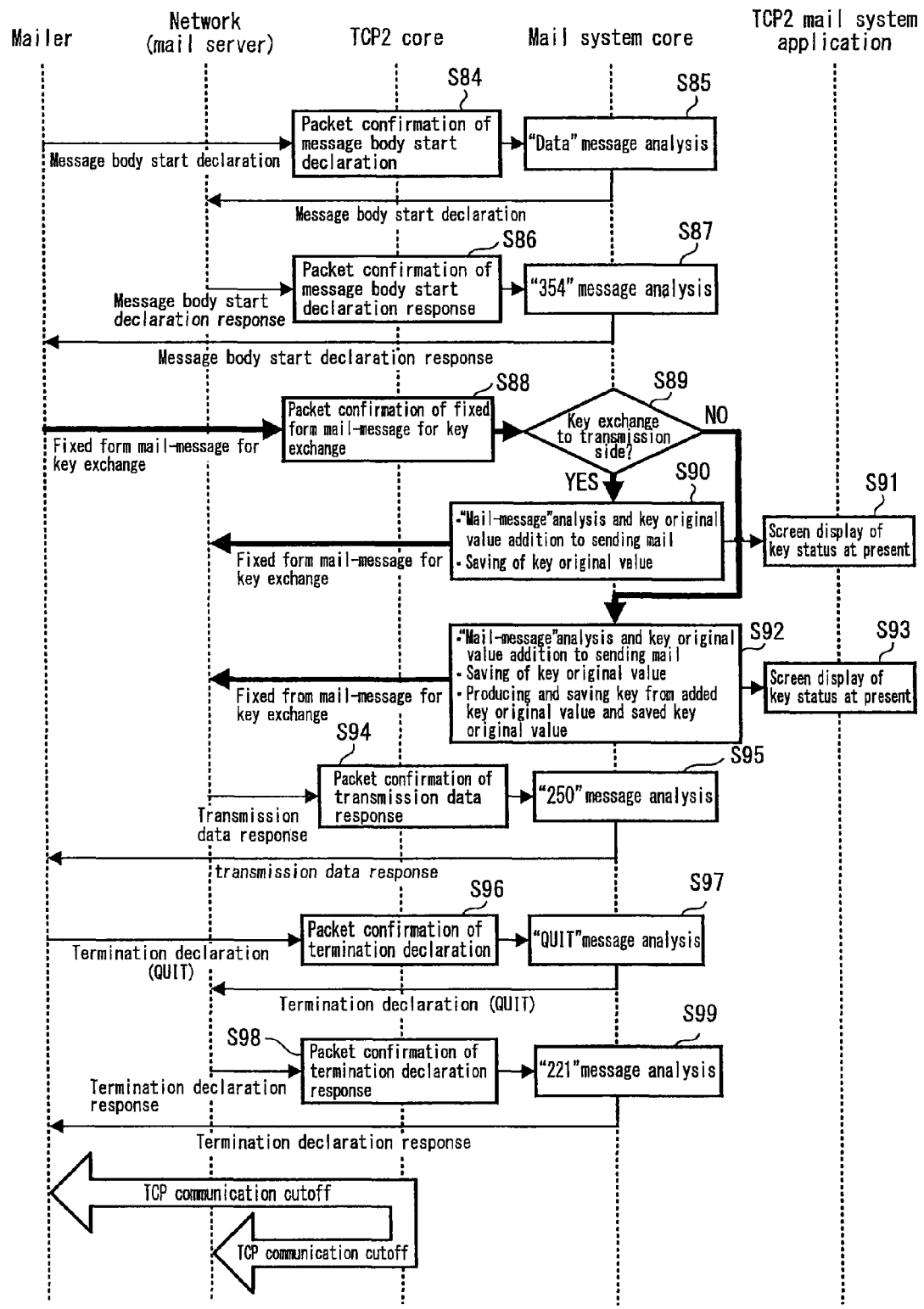
FIG. 13 is a portion of a flow chart showing a flow of the key exchange transmission side in a mail system of the present invention.

Next, a flow on the key exchange transmission side will be described based on a flowchart of FIG. 11 to FIG. 13.

First, hooking requests for catching the packets of the POP3 and SMTP IP addresses and port numbers of the mail servers of all the registered users are issued without interruption from the mail system core 37 of the TCP2 driver 34 of the TCP2 mail system to the TCP2 core (step S50). The hooking request is a request to catch the packets including those of the POP3 and SMTP IP addresses and port numbers of the mail servers registered for all the registered users. Upon receiving the hooking request, the TCP2 core 36 catches (hooks) the packets including those of the IP addresses and the port numbers of the POP3 and SMTP servers of all the users which are registered (step S51).

Here, when carrying out the transmission and reception of the encrypted mail by the TCP2 mail system, it is necessary to carry out first between the users sending and receiving the encrypted mail the transmission and reception of the key exchange fixed-form mail.

For this reason, first, the key exchange fixed-form mail is inputted to the mailer 31 of the terminal (new transmission side terminal: "client apparatus A") and the inputted key exchange fixed-form mail is transmitted to the mail server 41 connected to the network 40 (step S52). The mail server 41 transfers the key exchange fixed-form mail to the mail server of the key exchange receiving side terminal (new reception side terminal: "client apparatus B") and the receiving side terminal (client apparatus B) can receive the key exchange fixed-form mail by accessing the mail server.

POP3 is first connected between the client apparatus A and the mail server 41 before a mail transmission request is issued from SMTP. In this step, the TCP communication is established between the existing mailer 31 and the mail server 41 (see FIG. 4) connected to the network 40 through the TCP2 core.

Thereafter, a POP3 connection message is transmitted from the mail server 41 connected to the network 40, and the TCP2 core 36 receives the POP3 connection message and upon recognizing that it is the POP3 packet, a hook result is notified to the mail system core 37 (step S53).

Upon receiving the hook result from the TCP2 core 36, the mail system core 37 requests the TCP2 core 36 to receive (intercept) the packet (step S54). Upon receiving the intercept request from the mail system core 37, the TCP2 core 36 starts the intercept of the packet (step S55).

Subsequently, a user ID is transmitted from the existing mailer 31 to the TCP2 core 36 and the TCP2 core 36 confirms the packet of the user ID (step S56), and "USER" message from the mailer is transmitted to the mail system core 37. The "USER" message is, as described in the user registration (see FIG. 8), a POP3 fundamental command issued in the case of connecting a client to the server.

The mail system core 37 analyzes the "USER" message from the TCP2 core 36 and saves the user ID temporarily in the storage medium 38 (see FIG. 3 and FIG. 5) (step S57). Here, the temporary saving indicates a step in which authentication has not been attained by the password confirmation or the like, that is, a step of previous saving before the formal storage after the authentication. Subsequently, the user ID is transmitted to the mail server 41 connected to the network 40.

A response to the user ID is returned from the mail server 41 to the TCP2 core 36, and the TCP2 core 36 confirms the packet of the user ID response message and sends an "+OK" message which is the result of the confirmation to the mail system core 37 (step S58). "+OK" message is a message telling "User recognized, send password" in the mail server 41. The mail system core 37 analyzes the "+OK" message and transfers the user ID response from the mail server 41 to the mailer 31 (step S59).

Next, the password message is transmitted from the existing mailer 31 of the client apparatus A to the mail server 41 connected to the network 40. The password message transmitted from the mailer 31 is confirmed in the TCP2 core 36 and the packet of the confirmed password message is transmitted to the mail system core 37 (step S60). The mail system core 37 receives "PASS" message from the TCP2 core 36 and analyzes the message. As a result of the analysis, the mail system core saves the password temporarily (temporary saving) in the storage medium 38 and transmits the password to the mail server 41 connected to the network 40 (step S61).

Next, when the password response message returns from the mail server 41 to the client apparatus A, the TCP2 core 36 confirms the packet of the password response message and transmits the packet of the password response message to the mail system core 37 (step S62). The mail system core 37 receives the packet of the password response message and analyzes the message. More specifically, the mail system core 37 analyzes the "+OK" message indicating that the password was confirmed, carries out authentication by collating the user ID and the password temporarily saved in the storage medium 38 with the user ID and the password registered in the storage medium 38 and acquires key information (step S63). Then, after acquiring the key information, the mail system core 37 transmits a password response to the mailer 31.

Upon receiving the password response, the mailer 31 sends a termination declaration (QUIT) reporting that the connection is released to the TCP2 core 36, and the TCP2 core 36 reports that the termination declaration was confirmed to the mail system core 37 (step S64). The mail system core 37 analyzes the "QUIT" message and sends the termination declaration (QUIT) to the mail server 41 connected to the network 40 (step S65).

Subsequently, a termination declaration response is returned from the mail server 41 to the TCP2 core 36, and the TCP2 core 36 confirms the packet of the termination declaration response (step S66) and sends the result to the mail system core 37. The mail system core 37 analyzes the "+OK" message from the TCP2 core 36 and transfers the termination declaration response to the mailer 31 (step S67). Thus, the cutoff of the TCP communication between the client apparatus A and the mail server 41 (client apparatus B) connected to the network 40 is completed.

Next, a second step of the key exchange transmission side will be described based on FIG. 12.

The second step starts, similarly as the occasion of the user registration (see FIG. 9), from a mail transmission request from the SMTP of the mailer 31 to the mail server 41 connected to the network 40 (step S68). With this, the TCP communication is established between the mailer 31 and the mail server 41 through the TCP2 core.

After the TCP communication is established, an SMTP connection message is transmitted from the mail server 41 to the TCP2 core 36, and upon receiving the SMTP response code "220", the TCP2 core 36 recognizes that it is the SMTP port and notifies the search result to the mail system core 37 (step S69).

Subsequently, the mail system core 37 requests the TCP2 core 36 to receive (intercept) the packet (step S70), and the TCP2 core 36 which receives the request starts the reception of the packet (step S71).

Next, the mailer 31 of the client apparatus issues a utilization start declaration. The utilization start declaration is a message telling "From now, a mail will be transmitted" from the client apparatus to the server. The TCP2 core 36 confirms the packet of the utilization start declaration message (step S72) and sends it as the "HELO", "EHLO" message to the mail system core 37.

The mail system core 37 analyzes the "HELO", "EHLO" message and saves the SMTP IP address and port number in the storage medium 38 (step S73). Subsequently, the mail system core 37 transmits the utilization start declaration to the mail server 41 connected to the network 40. A utilization start declaration response thereto is issued from the mail server 41 and confirmed in the TCP2 core 36 (step S74).

The mail system core 37 analyzes the "250" message and sends the utilization start declaration response transmitted from the mail server 41 to the mailer 31 (step S75).

Subsequently, a sender declaration is transmitted from the mailer 31. The TCP2 core 36 confirms the packet of the sender declaration and sends this to the mail system core 37 (step S76). This sender declaration message is a message referred to as "MAIL FROM:<" and is a message informing the sender. The mail system core 37 analyzes the message, saves the mail address of the sender in the storage medium 38 (step S77), and sends a sender declaration to the mail server 41.

Upon receiving the sender declaration, the mail server 41 issues a sender declaration response. The TCP2 core 36 confirms the packet of the sender declaration response and sends the response code "250" to the mail system core 37 (step S78). The mail system core 37 analyzes the "250" response code and thereafter, sends the received sender declaration response to the mailer 31 of the client apparatus (step S79).

Subsequently, the mailer 31 transmits a recipient declaration message. The recipient declaration message is a message for reporting "Please send a mail to this e-mail address" to the mail server 41 and is expressed by symbols as "RCPT TO:<". The TCP2 core 36 confirms the recipient declaration message (step S80) and sends it to the mail system core 37. The mail system core 37 analyzes the "RCPT TO:<" message, saves the receiver mail address in the storage medium 38, and sends the recipient declaration to the mail server 41 (step S81).

Upon receiving this, the mail server 41 returns a recipient declaration response to the TCP2 core 36, and the TCP2 core 36 confirms the recipient declaration response and sends it as a response code "250" to the mail system core 37 (step S82). The mail system core 37 analyzes the recipient declaration response and transfers it to the mailer 31 of the client terminal (step S83).

Subsequently, a third step of a flow of the key exchange transmission side will be described based on FIG. 13. More specifically, the mailer 31 of the client apparatus A which receives the recipient declaration response transmits a message body start declaration. The TCP2 core 36 confirms the packet of the message body start declaration and supplies it as a "DATA" message to the mail system core 37 (step S84). Here, "DATA" is an SMTP command meaning the message body transmission. The mail system core 37 analyzes the "DATA" message and sends the message body start declaration to the mail server 41 (step S85).

Upon receiving the message body start declaration, the mail server 41 sends a message body start declaration response to the client apparatus A. Subsequently, the TCP2 core 36 of the client apparatus A confirms the packet of the message body start declaration response and send it as a "354" message to the mail system core 37 (step S86). Here, the response code "354" is an SMTP response code showing input start of the mail.

The mail system core 37 analyzes the "354" message and sends a message body start declaration response transmitted from the mail server 41 to the mailer 31 of the terminal (step S87).

Upon receiving this, the mailer 31 sends a key exchange fixed-form mail message to the mail server 41. At that time, the TCP2 core 36 confirms the packet of the key exchange fixed-form mail message and sends it to the mail system core 37 (step S88).

Upon receiving the packet of the key exchange fixed-form mail message, here, the mail system core 37, first, determines whether or not the key exchange is to the transmission side (step S89). More specifically, with respect to the key exchange, it is necessary for each of terminals (client apparatuses A and B) who transmit and receive the encrypted mails to mutually send the key exchange fixed-form mail to the other apparatus. For example, in the case of transmitting and receiving encrypted mails between the client apparatus A and the client apparatus B, first, the key exchange fixed-form mail message is transmitted from the transmission side client apparatus A to the receiving side client apparatus B and subsequently, the key exchange fixed-form mail message is transmitted from the receiving side client apparatus B to the transmission side client apparatus A. The determination step S89 is a step for determining whether the key exchange is to the transmission side or to the receiving side. It is needless to say that the mail server 41 (see FIG. 4) intervenes between the transmission and reception of the key exchange fixed-form mail message.

In the case where it is determined in the determination step S89 that the key exchange fixed-form mail message is from the transmission side (client apparatus A), the mail system core 37 analyzes the "mail-message" and transmits the mail with a key original value added thereto to the mail server 41 connected to the network 40 (step S90). At that time, the key original value is stored in the storage medium 38 and transmitted to the TCP2 mail system application unit 35, and the key status at present is displayed on the output apparatus 33 (step S91).

Also, in the case where it is determined in the determination step S89 that the key exchange is not to the transmission side (client apparatus A), that is to say, in the case where it is determined that the key exchange is to the reception side (client apparatus B), the mail system core 37 analyzes the "mail-message", transmits a mail with the key original value added thereto to the mail server 41 connected to the network 40 and saves the key original value in the storage medium 38 (step S92). Then, a new key is produced from the added key original value and the key original value already saved in the storage medium 38 and saved in the storage medium 38. Then, the newly produced key is transmitted to the TCP2 mail system application unit 35 and the key status at present is displayed on the output apparatus 33 (step S93). Via the processes as described above, the key exchange fixed-form mail message is transmitted to the mail server 41 (client apparatus B).

Next, a transmission data response message is transmitted from the mail server 41 to the client apparatus A. The TCP2 core 36 confirms the packet of the transmission data response message and sends the packet of the transmission data response message to the mail system core 37 (step S94). Upon receiving the packet of the transmission data response message, the mail system core 37 analyzes the message. More specifically, the mail system core 37 analyzes the "250 OK" message of the SMTP response code and transmits the transmission data response to the mailer 31 of the terminal (client apparatus A) (step S95).

The mailer thus receiving the transmission data response from the mail server 41 transmits a termination declaration message "QUIT" to the mail server 41. The TCP2 core 36 receiving the termination declaration message confirms the packet (step S96) and sends it as a "QUIT" message to the mail system core 37. The mail system core 37 analyzes the "QUIT" message and sends a termination declaration to the mail server 41 (step S97). The mail server 41 issues a termination declaration response to the termination declaration and sends it to the client apparatus A. Then, the TCP2 core 36 of the client apparatus A confirms the packet of the received termination declaration response and sends it as an SMTP response code "221" message to the mail system core 37 (step S98). The "221" message is an SMTP response code telling that connection will be shut down. The mail system core 37 analyzes the "221" message and sends the termination declaration response thereof to the mailer 31 of the terminal (step S99). Accordingly, the flow of the key exchange transmission side is all completed and the TCP communication between the mailer 31 of the client apparatus A and the mail server 41 is cut off.

<Description of a Flow on the Key Exchange Receiving Side>

Next, a flow on the key exchange receiving side will be described based on a flowchart of FIG. 14 and FIG. 15.

Figure 14:
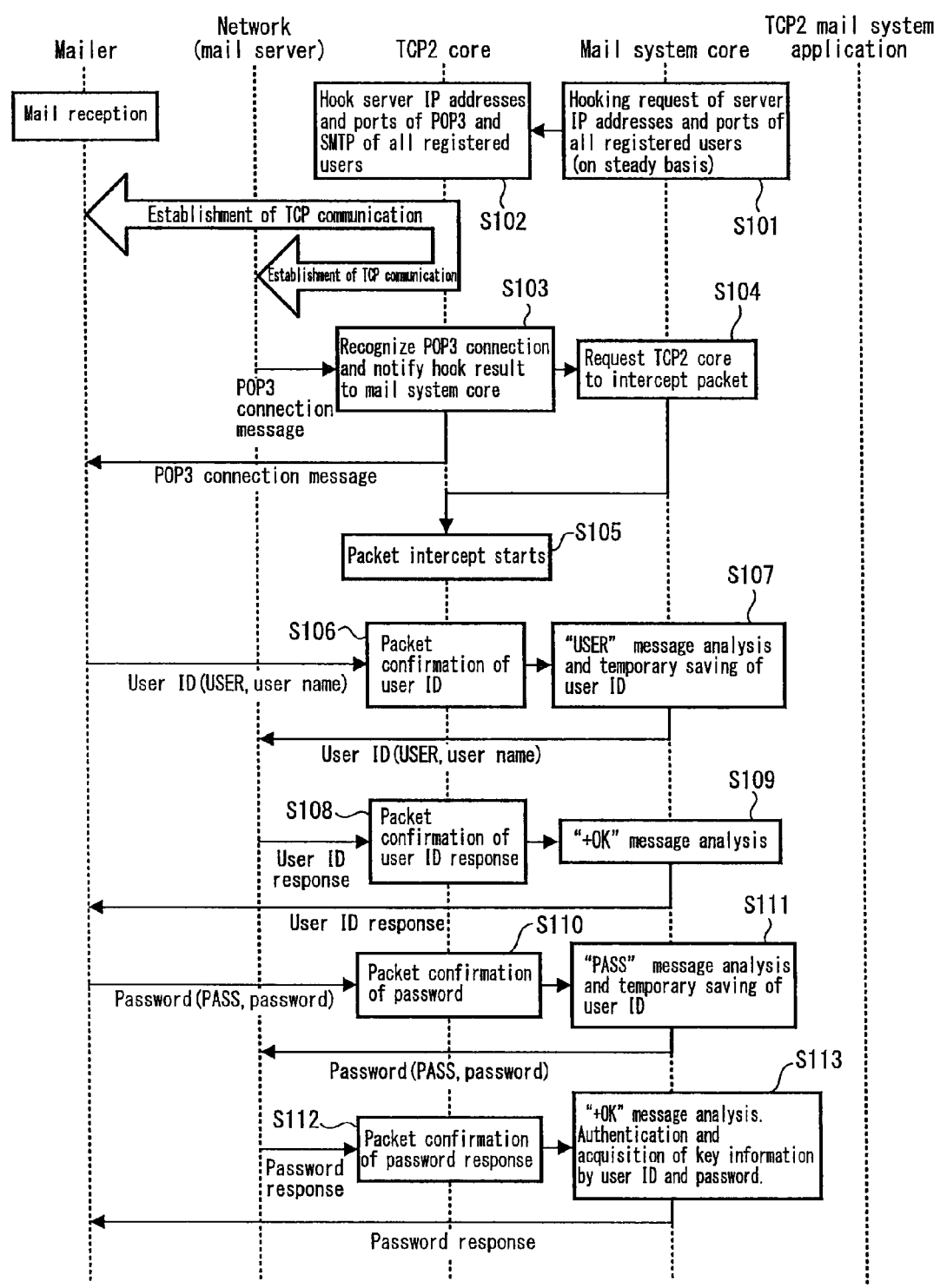
FIG. 14 is a portion of a flow chart showing a flow of the key exchange receiving side in a mail system of the present invention.
Figure 15:
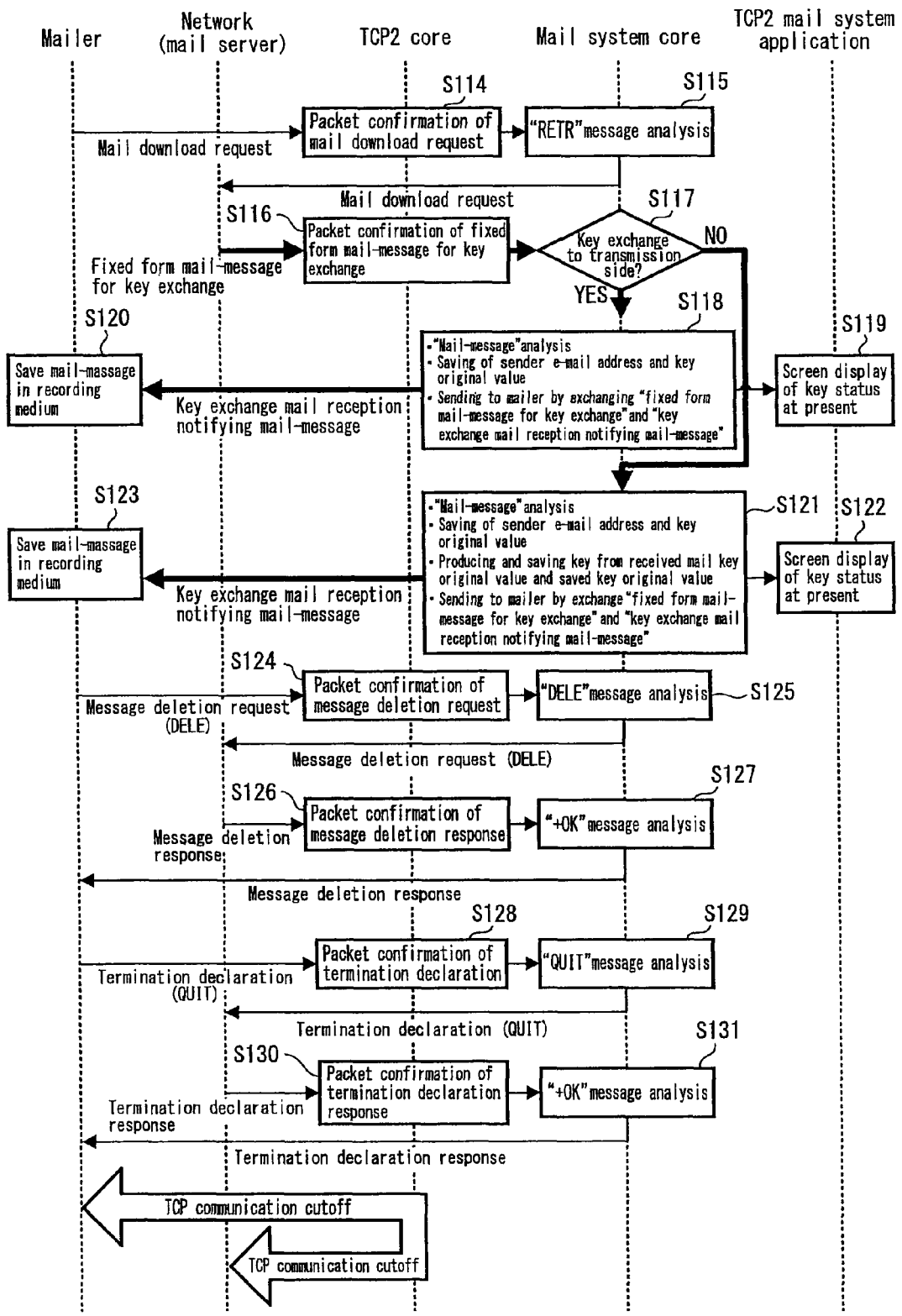
FIG. 15 is a portion of a flow chart showing a flow of the key exchange receiving side in a mail system of the present invention.

As shown in FIG. 14, first, hooking requests for catching the packets including those of the IP addresses and port numbers of the POP3 and SMTP servers of all the registered users are issued without interruption from the mail system core 37 of the TCP2 driver 34 to the TCP2 core (step S101). Upon receiving the hooking request, the TCP2 core 36 catches (hooks) the packets including those of the IP addresses and the port numbers of the POP3 and SMTP servers of all the users which are registered (step S102).

When a mail reception is executed by the existing mailer 31 on the key exchange receiving side, a TCP communication is established between the existing mailer 31 and the mail server 41 connected to the network 40 (see FIG. 4). In other words, a TCP communication is established between the client apparatus A having the existing mailer 31 and the mail server 41 (or the client apparatus B) connected to the network 40.

A POP3 connection message is transmitted from the mail server 41 connected to the network 40, and the TCP2 core 36 receives the POP3 connection message and upon recognizing that it is a connection message from the POP3 port, a hook result is notified to the mail system core 37 (step S103).

Upon receiving the hook result from the TCP2 core 36, the mail system core 37 requests the TCP2 core 36 to receive (intercept) the packet (step S104). Upon receiving the intercept request from the mail system core 37, the TCP2 core 36 starts the intercept of the packet (step S105).

Subsequently, a user ID is transmitted from the mailer 31 of the client apparatus A to the TCP2 core 36, and the TCP2 core 36 confirms the packet of the user ID (step S106) and transmits a "USER" message from the mailer to the mail system core 37. The mail system core 37 analyzes the "USER" message, saves the user ID temporarily in the storage medium 38 (see FIG. 3, FIG. 5) (step S107). Here, the temporary saving indicates a step in which authentication has not been attained by the password confirmation or the like, that is, saving of a previous step for the formal saving after the authentication. Then, the user ID is transmitted to the mail server 41 connected to the network 40.

A response to the user ID is returned from the mail server 41 to the TCP2 core 36, and the TCP2 core 36 confirms the packet of the user ID response message and sends an "+OK" message which is the result thereof to the mail system core 37 (step S108). The "+OK" message is a message telling "User recognized, send password" in the mail server 41. The mail system core 37 analyzes the "+OK" message and transfers the user ID response from the mail server 41 to the mailer 31 (step S109).

Next, the password message is transmitted from the existing mailer 31 of the client apparatus A to the mail server 41 connected to the network 40. The password message transmitted from the mailer 31 is confirmed in the TCP2 core 36 and the packet of the confirmed password message is transmitted to the mail system core 37 (step S110). The mail system core 37 receives and analyzes the "PASS" message from the TCP2 core 36. As a result of the analysis, the mail system core 37 saves the password temporarily (temporary saving) in the storage medium 38 and transmits the password to the mail server 41 connected to the network 40 (step S111).

Next, when the password response message returns from the mail server 41 to the client apparatus A, the TCP2 core 36 confirms the packet of the password response message and transmits the packet of the password response message to the mail system core 37 (step S112). The mail system core 37 analyzes the packet of the "+OK" message which is the password response message, authenticates the user ID and the password saved temporarily based on the user ID and the password already registered in the storage medium 38 and obtains key information (step S113). Then, the received password response is transmitted to the mailer 31.

Subsequently, the flow continued on the key exchange receiving side will be described based on FIG. 15. Upon receiving the transmission of the password response from the mail system core 37, the mailer 31 issues a mail download request. The TCP2 core 36 confirms the packet of the download request from the mailer 31 and reports it as a "RETR" message to the mail system core 37 (step S114). The mail system core 37 analyzes the "RTER" message and sends the mail download request to the mail server 41 connected to the network 40 (step S115). Here, the "RETR" message is a POP3 fundamental command for receiving a message specified by a parameter. If a line without a message is specified as a parameter, it is configured such that "−ERR message does not exist" is returned.

Thereafter, a key exchange fixed-form mail message is transmitted from the mail server 41. The key exchange fixed-form mail message is a message transmitted from the client apparatus B (reception side) connected to the network 40 to the client apparatus A (transmission side).

The TCP2 core 36 confirms the packet of the key exchange fixed-form mail message and sends it to the mail system core 37 (step S116).

Upon receiving the packet of the key exchange fixed-form mail message, the mail system core 37, first, determines here whether or not the key exchange is to the reception side (step S117). For example, in the case of transmitting and receiving encrypted mails between the client apparatus A and the client apparatus B, first, a key exchange fixed-form mail message is transmitted from the transmission side client apparatus A to the receiving side client apparatus B and subsequently, a key exchange fixed-form mail message is transmitted from the receiving side client apparatus B to the transmission side client apparatus A. The determination step S117 is a step for determining whether or not the key exchange was transmitted from the client apparatus B on the receiving side. As described above, it is necessary for both the sides who send and receive the encrypted mail to send the key exchange fixed-form mail mutually to the other in the key exchange.

In the case where it is determined in the determination step S117 that the key exchange fixed-form mail message is from the receiving side (client apparatus B), the mail system core 37 analyzes the "mail-message" and saves the sender e-mail address and the key original value in the storage medium 38. Also, the "key exchange fixed-form mail message" and the "key exchange mail reception notifying mail message" are exchanged and transmitted to the mailer 31 (step S118). At that time, the key status at present is transmitted to the TCP2 mail system application unit 35, and is displayed on the output apparatus 33 (step S119). Then, a key exchange reception mail message is transmitted to the mailer 31 of the terminal. The mailer 31 receives and saves this message in the storage medium 39 (step S120).

Also, in the case where it is determined in the determination step S117 that the key exchange is not to the reception side (client apparatus B), that is to say, in the case where it is determined that the key exchange is to the transmission side (client apparatus A), the mail system core 37 analyzes the "mail message" and saves the sender e-mail address and the key original value in the storage medium 38. Also, a new key is produced from the key original value of the received mail and the key original value saved in the storage medium 38 and the new key is saved in the storage medium 38. Subsequently, the "key exchange fixed-form mail message" and the "key exchange mail reception notifying mail message" are exchanged and transmitted to the mailer 31 (step S121). At that time, the key status at present is transmitted to the TCP2 mail system application unit 35, and is displayed on the output apparatus 33 (step S122).

The mailer 31 saves the received "key exchange mail reception notifying mail-message" in the storage medium 39 (step S123) and sends the message deletion request "DELE" to the TCP2 core 36. The TCP2 core 36 confirms the packet of the message deletion request (step S124) and sends it to the mail system core 37. The mail system core 37 analyzes the message deletion request "DELE" and sends the message deletion request to the mail server 41 (step S125).

Upon receiving the message deletion request, the mail server 41 sends a message deletion response to the TCP2 core 36 and the TCP2 core 36 confirms the packet (step S126). The mail system core 37 analyzes the "+OK" message of the message deletion response and sends it to the mailer 31 (step S127).

Upon receiving the message deletion response, the mailer 31 sends a termination declaration message "QUIT" to the mail server 41, and the TCP2 core 36 receiving the termination declaration message confirms the packet (step S128) and sends it as a "QUIT" message to the mail system core 37. The mail system core 37 analyzes the "QUIT" message and sends the termination declaration to the mail server 41 (step S129).

The mail server 41 issues a termination declaration response with respect to the termination declaration and sends it to the TCP2 core 36 of the client apparatus A. Then, the TCP2 core 36 of the client apparatus A confirms the packet of the received termination declaration response and sends the SMTP response code "+OK" message to the mail system core 37 (step S130). The mail system core 37 analyzes the "+OK" message and sends the termination declaration response thereof to the mailer 31 of the terminal (step S131). Accordingly, the flow on the key exchange receiving side is all completed and the TCP communication between the mailer 31 of the client apparatus A and the mail server 41 (client apparatus B) is cut off.

<Description of a Flow on the Encrypted Mail Transmission Side>

Figure 16:
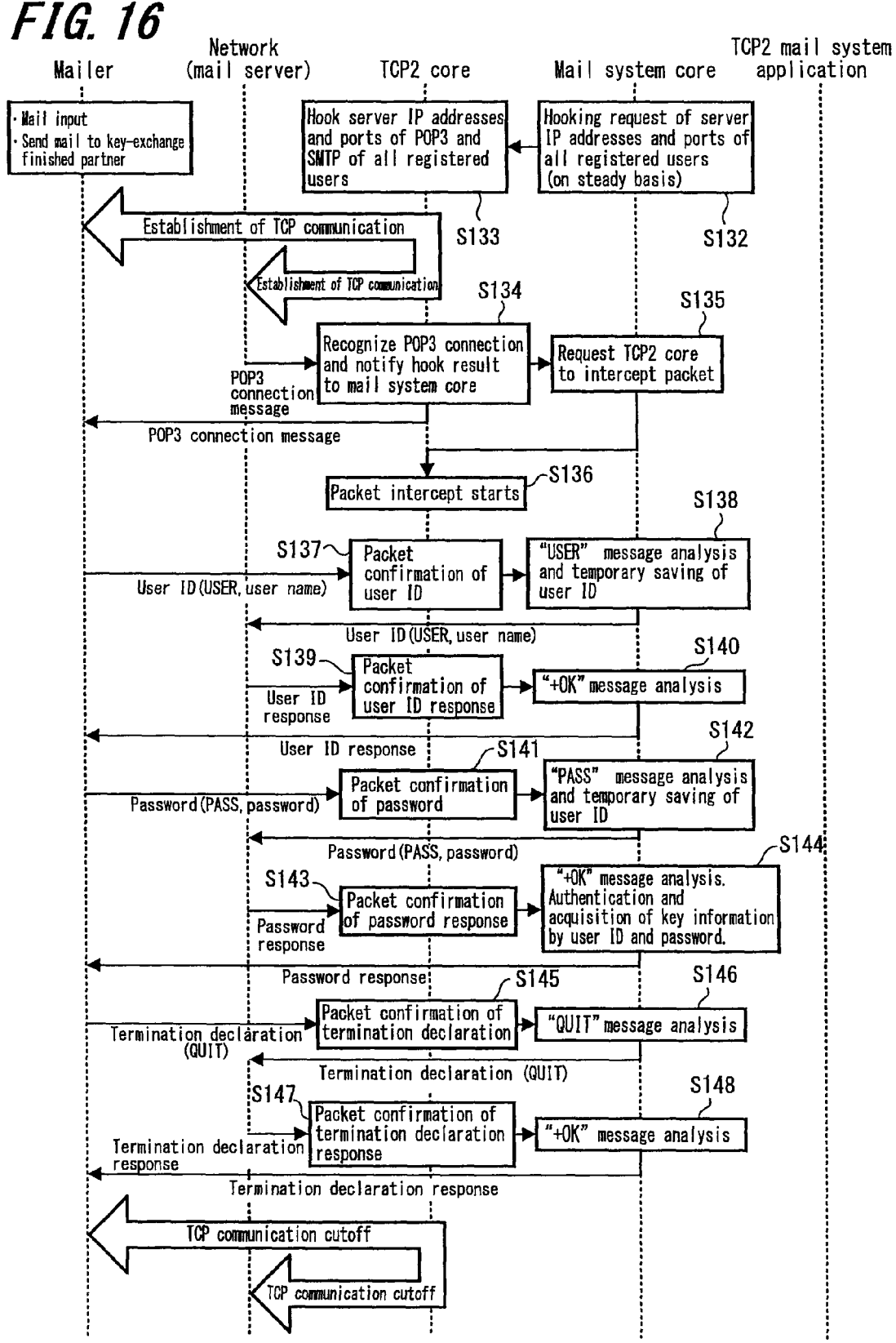
FIG. 16 is a portion of a flow chart showing a flow of an encrypted mail transmission side in a mail system of the present invention.
Figure 17:
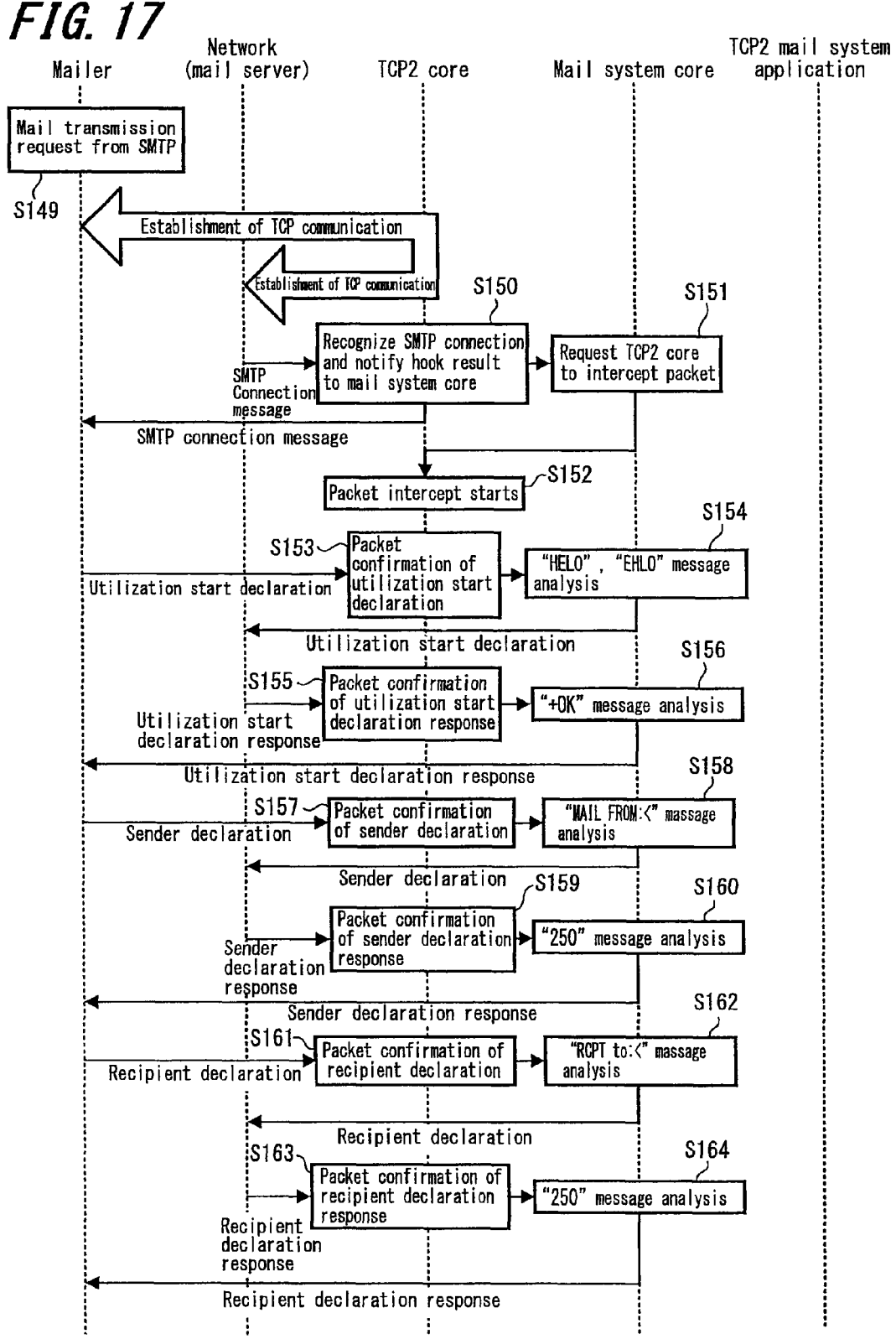
FIG. 17 is a portion of a flow chart showing a flow of an encrypted mail transmission side in a mail system of the present invention.
Figure 18:
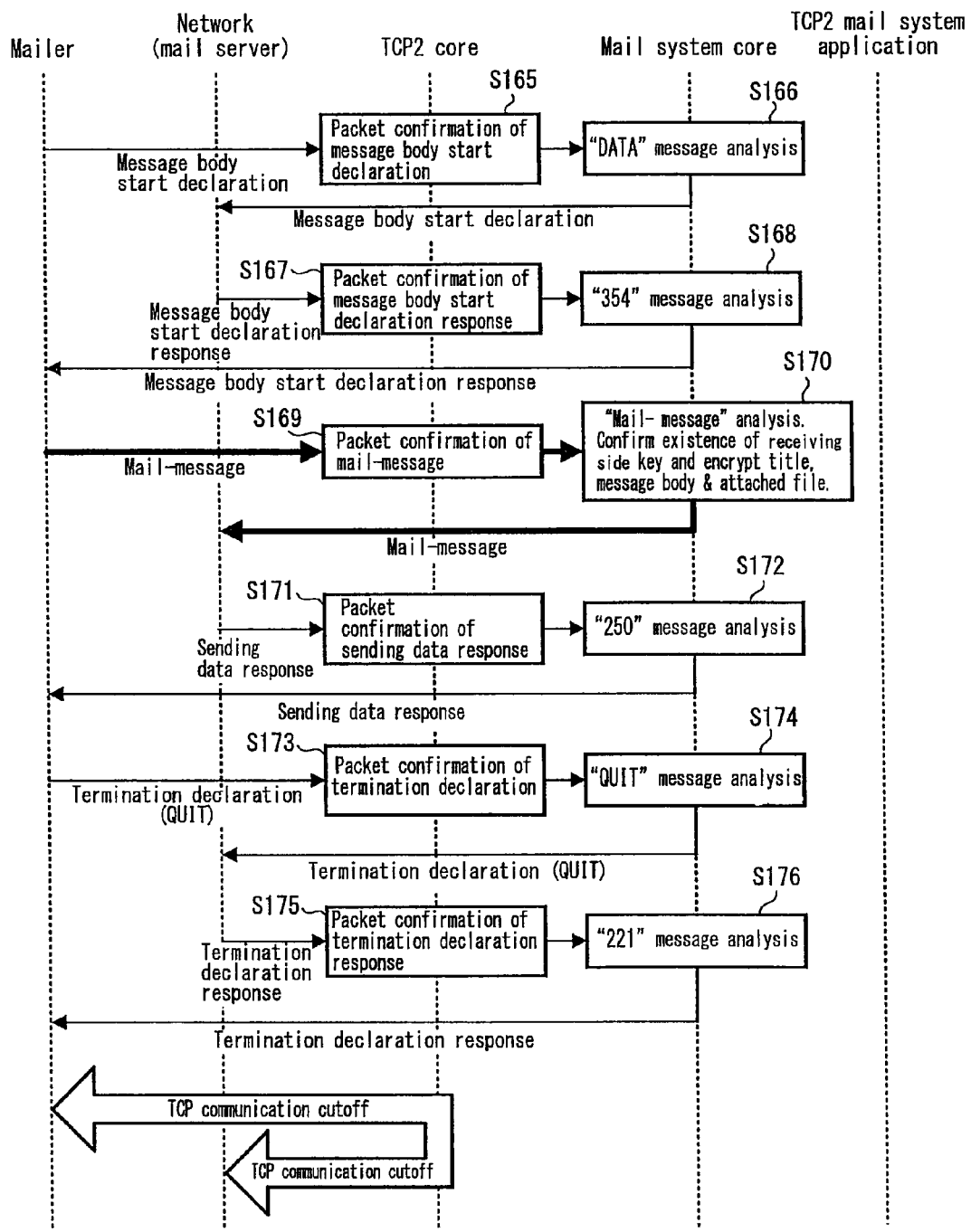
FIG. 18 is a portion of a flow chart showing a flow of an encrypted mail transmission side in a mail system of the present invention.

Next, a flow on the encrypted mail transmission side will be described based on a flowchart of FIG. 16 to FIG. 18.

First, hooking requests for the packets including those of the IP addresses and port numbers of the SMTP and POP3 servers of all the registered users are issued without interruption from the mail system core 37 of the TCP2 driver 34 (step S132). Upon receiving the hooking request, the TCP2 core 36 catches (hooks) the packets including those of the IP addresses and the port numbers of the POP3 and SMTP servers of all the users which are registered (step S133).

Subsequently, in the flow on the encrypted mail transmission side, a mail is inputted by the mailer 31 and a mail is transmitted to a partner with whom the key exchange was finished. At that time, POP3 is connected before a mail transmission request made by SMTP. In this step, TCP communication is established between the client apparatus A (terminal) and the mail server 41 connected to the network 40 through the TCP2 core.

In this step, a POP3 connection message is transmitted from the mail server 41 connected to the network 40, and the TCP2 core 36 receives the POP3 connection message and when recognizing that it is the POP3 port, a hook result is notified to the mail system core 37 (step S134).

Upon receiving the hook result from the TCP2 core 36, the mail system core 37 requests the TCP2 core 36 to intercept the packet (step S135). Upon receiving the intercept request from the mail system core 37, the TCP2 core 36 starts the intercept of the packet (step S136).

Subsequently, a user ID is transmitted from the existing mailer 31 to the TCP2 core 36, and the TCP2 core 36 confirms the packet of the user ID (step S137) and transmits a "USER" message from the mailer to the mail system core 37. The "USER" message is, as described in the user registration (see FIG. 8), a POP3 fundamental command issued in the case of connecting a client to the server.

The mail system core 37 analyzes the "USER" message from the TCP2 core 36, saves the user ID temporarily in the storage medium 38 (see FIG. 3, FIG. 5) (step S137). Here, the temporary saving indicates a step in which authentication has not been attained by the password confirmation or the like, that is, saving of a previous step for the formal saving after the authentication. Then, the user ID is transmitted to the mail server 41 connected to the network 40.

A response to the user ID is returned from the mail server 41 to the TCP2 core 36, and the TCP2 core 36 confirms the packet of the user ID response message and sends an "+OK" message which is the result thereof to the mail system core 37 (step S139). This "+OK" message is a message telling "User recognized, send password" in the mail server 41. The mail system core 37 analyzes the "+OK" message and transfers the user ID response from the mail server 41 to the mailer 31 (step S140).

Next, the password message is transmitted from the existing mailer 31 of the client apparatus A to the mail server 41 connected to the network 40. The password message transmitted from the mailer 31 is confirmed in the TCP2 core 36 and the packet of the confirmed password message is transmitted to the mail system core 37 (step S141). The mail system core 37 receives and analyzes the "PASS" message from the TCP2 core 36. As a result of the analysis, the mail system core 37 saves the password temporarily (temporary saving) in the storage medium 38 and transmits the password to the mail server 41 connected to the network 40 (step S142).

Next, when the password response message returns from the mail server 41 to the client apparatus A, the TCP2 core 36 confirms the packet of the password response message and transmits the packet of the password response message to the mail system core 37 (step S143). The mail system core 37 receives the packet of the password response message and analyzes the message. More specifically, the mail system core 37 analyzes the "+OK" message showing that the password was confirmed, and authenticates the user ID and the password temporarily saved in the storage medium 38 by collating those with the user ID and the password registered in the storage medium 38 and the key information is acquired (step S144). Subsequently, after the key information is acquired, a password response is transmitted to the mailer 31.

Upon receiving the password response, the mailer 31 sends a termination declaration (QUIT) reporting that the connection is released to the TCP2 core 36, and the TCP2 core 36 reports that the termination declaration was confirmed to the mail system core 37 (step S64). The mail system core 37 analyzes the "QUIT" message and sends the termination declaration (QUIT) to the mail server 41 connected to the network 40 (step S65).

Subsequently, a termination declaration response is returned from the mail server 41 to the TCP2 core 36, and the TCP2 core 36 confirms the packet of the termination declaration response (step S145) and sends the result to the mail system core 37. The mail system core 37 analyzes the "+OK" message from the TCP2 core 36 and transfers the termination declaration response to the mailer 31 (step S146). Accordingly, the cutoff of the TCP communication between the client apparatus A and the mail server 41 (client apparatus B) connected to the network 40 is completed.

Next, a second step of the flow on the encrypted mail transmission side will be described based on FIG. 17.

The second step starts, similarly to the flow on the key exchange transmission side (see FIG. 12), from a mail transmission request from the SMTP of the mailer 31 to the mail server 41 connected to the network 40 (step S149). Thus, the TCP communication is established between the mailer 31 and the mail server 41 through the TCP2 core.

After the TCP communication is established, an SMTP connection message is transmitted from the mail server 41 to the TCP2 core 36, and upon receiving the SMTP response code "220", the TCP2 core 36 recognizes that it is the SMTP port and notifies the search result to the mail system core 37 (step S150).

Subsequently, the mail system core 37 requests the TCP2 core 36 to receive (intercept) the packet (step S151), and the TCP2 core 36 receiving the request starts the reception of the packet (step S152).

Next, a utilization start declaration is issued from the mailer 31 of the client apparatus. The utilization start declaration is a message telling "From now, a mail will be transmitted" from the client apparatus to the server. The TCP2 core 36 confirms the packet of the utilization start declaration message (step S153) and sends it as the "HELO", "EHLO" message to the mail system core 37.

The mail system core 37 analyzes the "HELO", "EHLO" message and sends the utilization start declaration to the mail server 41 connected to the network 40 (step S154). A utilization start declaration response thereto is issued from the mail server 41 and this is confirmed in the TCP2 core 36 (step S155).

The mail system core 37 analyzes the "+OK" message and sends the utilization start declaration response transmitted from the mail server 41 to the mailer 31 (step S156).

Subsequently, a sender declaration is transmitted from the mailer 31. The TCP2 core 36 confirms the packet of the sender declaration and sends it to the mail system core 37 (step S157). The sender declaration message is a message referred to as "MAIL FROM:<" which informs a sender. The mail system core 37 analyzes the message and sends a sender declaration to the mail server 41 (step S158).

Upon receiving this, the mail server 41 issues a sender declaration response. The TCP2 core 36 confirms the packet of the sender declaration response and sends the response code "250" to the mail system core 37 (step S159). The mail system core 37 analyzes the "250" response code and thereafter, sends the received sender declaration response to the mailer 31 of the client apparatus (step S160).

Subsequently, the mailer 31 transmits a recipient declaration message. The recipient declaration message is a message to report "Please send a mail to this e-mail address." to the mail server 41 and is expressed as a symbol referred to as "RCPT TO:<". The TCP2 core 36 confirms the recipient declaration message (step S161) and sends it to the mail system core 37. The mail system core 37 analyzes the "RCPT TO:<" message and sends the recipient declaration to the mail server 41 (step S162).

Upon receiving this, the mail server 41 returns a recipient declaration response to the TCP2 core 36, and the TCP2 core 36 confirms the recipient declaration response and sends it as a response code "250" to the mail system core 37 (step S163). The mail system core 37 analyzes the recipient declaration response and transfers it to the mailer 31 of the client terminal (step S164).

Subsequently, a third step of a flow on the encrypted mail transmission side will be described based on FIG. 18. More specifically, the mailer 31 of the client apparatus A which receives the recipient declaration response issues a message body start declaration. The TCP2 core 36 confirms the packet of the message body start declaration and supplies it as a "DATA" message to the mail system core 37 (step S165). Here, "DATA" is an SMTP command meaning the message body transmission. The mail system core 37 analyzes the "DATA" message and sends the message body start declaration to the mail server 41 (step S166).

Upon receiving the message body start declaration, the mail server 41 sends a message body start declaration response to the client apparatus A. Then, the TCP2 core 36 of the client apparatus A confirms the packet of the message body start declaration response and send it as a "354" message to the mail system core 37 (step S167). Here, the response code "354" is an SMTP response code showing input start of the mail.

The mail system core 37 analyzes the "354" message and sends a message body start declaration response transmitted from the mail server 41 to the mailer 31 of the terminal (step S168).

Upon receiving this, the mailer 31 sends the mail message to the TCP2 core 36, and the TCP2 core confirms the mail message packet and supplies it to the mail system core 37 (step S169). Upon receiving the packet of the mail message, the mail system core 37 analyzes the mail message, confirms that there is a receiving side key, and encrypts a title, a message body and an attached file if any (step S170). Then, the mail system core 37 transmits the encrypted mail-message to the mail server 41 connected to the network 40.

Subsequently, a transmission data response message is transmitted from the mail server 41 to the client apparatus A. The TCP2 core 36 confirms the packet of the transmission data response message and sends the packet of the transmission data response message to the mail system core 37 (step S171). Upon receiving the packet of the transmission data response message, the mail system core 37 analyzes the message. More specifically, the mail system core 37 analyzes the "250" message of the SMTP response code and the transmission data response is sent to the mailer 31 of the terminal (client apparatus A) (step S172).

The mailer 31 which receives the transmission data response from the mail server 41 sends a termination declaration message "QUIT" to the mail server 41. The TCP2 core 36 which receives the termination declaration message confirms the packet (step S173) and send it as a "QUIT" message to the mail system core 37. The mail system core 37 analyzes the "QUIT" message and sends a termination declaration to the mail server 41 (step S174). The mail server 41 issues a termination declaration response with respect to the termination declaration and sends it to the client apparatus A. Then, the TCP2 core 36 of the client apparatus A confirms the packet of the received termination declaration response and sends it as an SMTP response code "221" message to the mail system core 37 (step S175). The "221" message is an SMTP response code telling that connection will be shut down. The mail system core 37 analyzes the "221" message and sends the termination declaration response thereof to the mailer 31 of the terminal (step S176). Accordingly, the flow on the encrypted mail transmission side is all completed and the TCP communication between the mailer 31 of the client apparatus A and the mail server 41 is cut off.

<Description of a Flow on the Encrypted Mail Receiving Side>

Next, a flow on the encrypted mail receiving side will be described based on a flowchart of FIG. 19 and FIG. 20.

Figure 19:
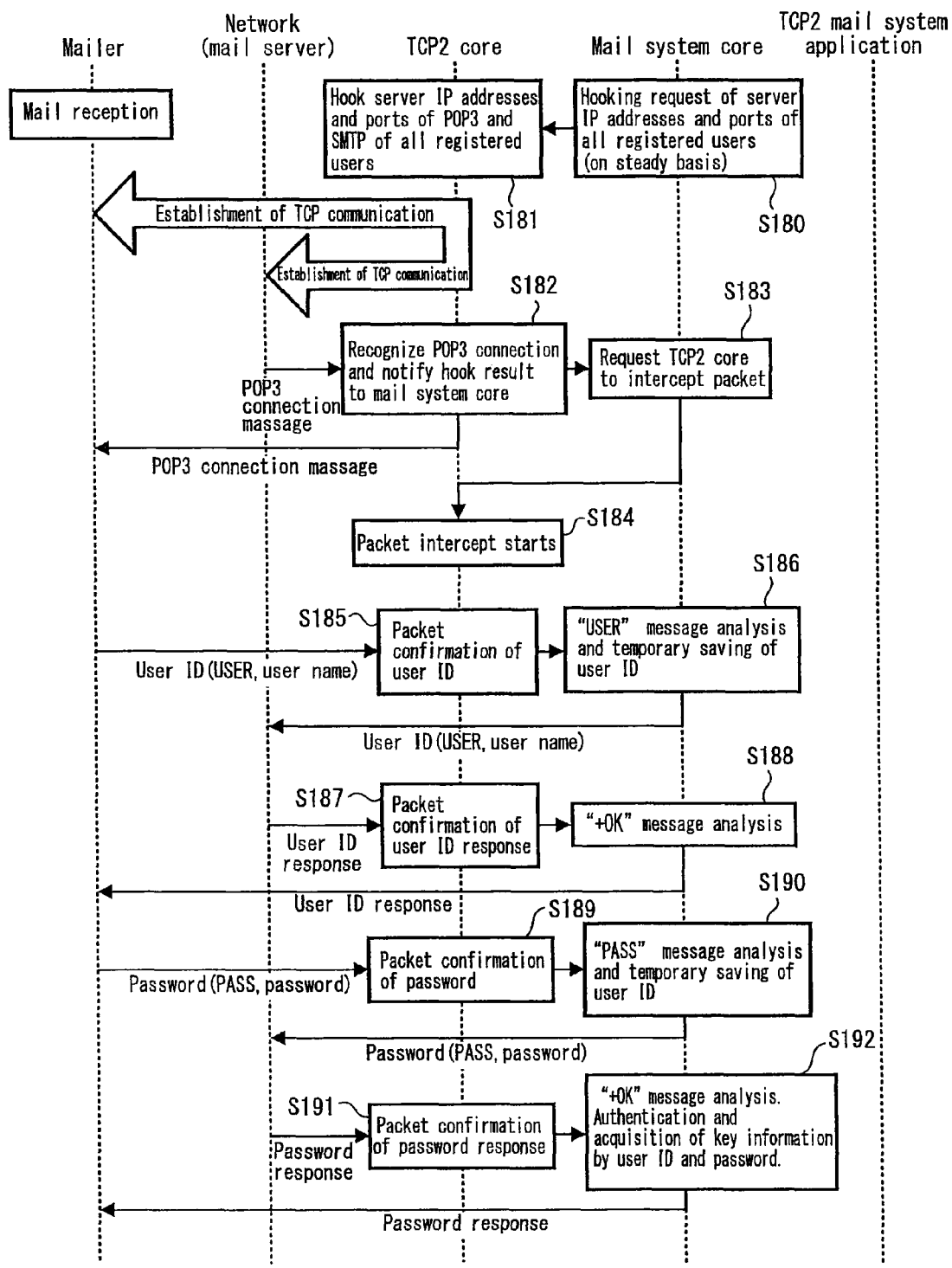
FIG. 19 is a portion of a flow chart showing a flow of an encrypted mail receiving side in a mail system of the present invention.
Figure 20:
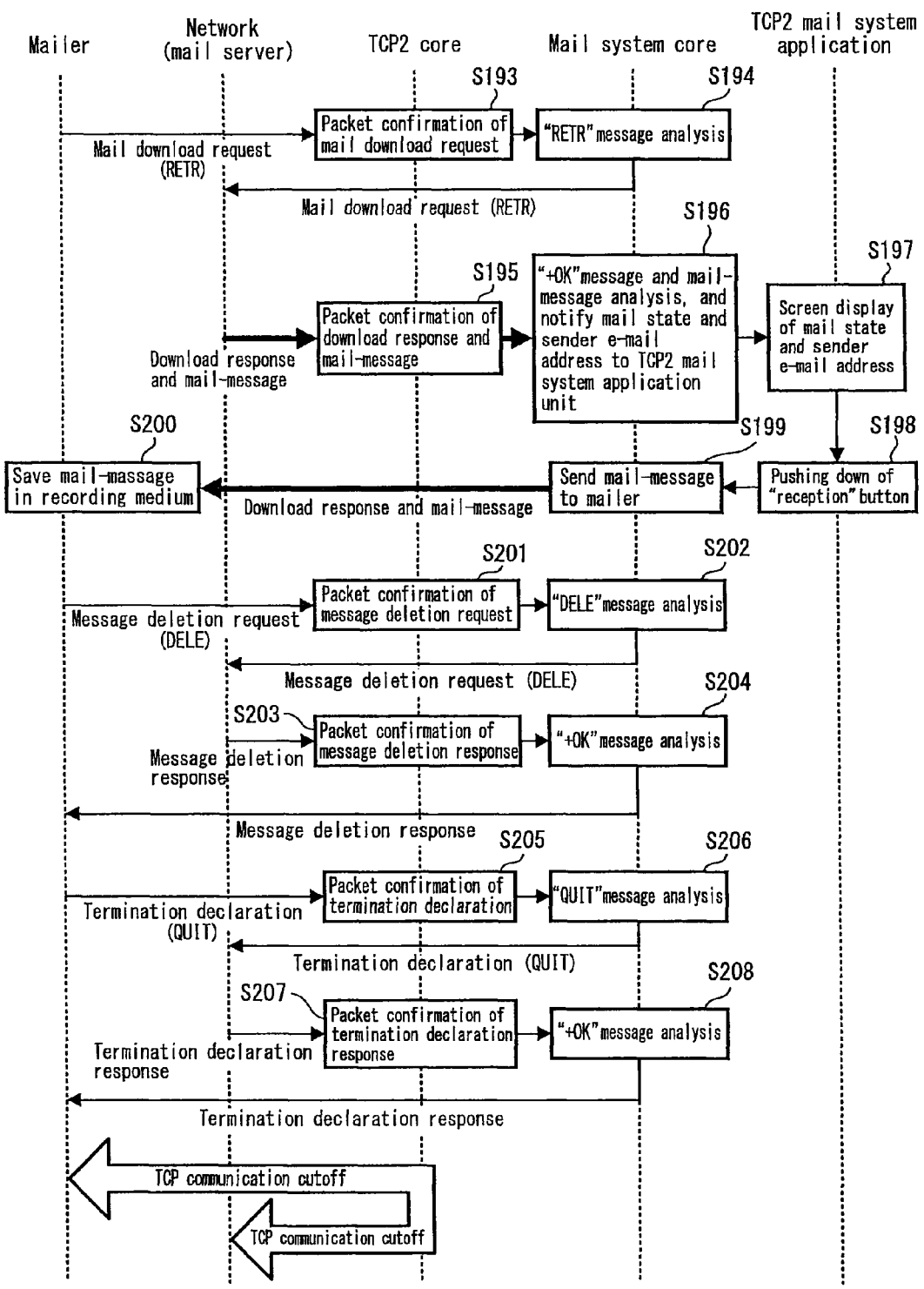
FIG. 20 is a portion of a flow chart showing a flow of an encrypted mail receiving side in a mail system of the present invention.

As shown in FIG. 19, the mail system core 37 of the TCP2 driver 34 issues hooking request on start-up for catching the packets including those of the IP addresses and the port numbers of the SMTP and POP3 servers of all the registered users without interruption (step S180). Upon receiving the hooking request, the TCP2 core 36 catches (hooks) the packets including those of the IP addresses and the port numbers of the POP3 and SMTP servers of all the users which are registered (step S181).

Then, the flow on the encrypted mail reception side starts when the existing mailer 31 executes a mail reception. In this step, a TCP communication is established between the existing mailer 31 and the mail server 41 connected to the network 40 (see FIG. 4). In other words, a TCP communication is established between the client apparatus A including the existing mailer 31 and the mail server 41 (client apparatus B) connected to the network 40.

A POP3 connection message is transmitted from the mail server 41 connected to the network 40, and the TCP2 core 36 receives the POP3 connection message and upon recognizing that it is the POP3 connection, a hook result is notified to the mail system core 37 (step S183).

Upon receiving the hook result from the TCP2 core 36, the mail system core 37 requests the TCP2 core 36 to intercept the packet (step S184). Upon receiving the intercept request from the mail system core 37, the TCP2 core 36 starts the intercept of the packet (step S185).

Subsequently, a user ID is transmitted from the mailer 31 of the client apparatus A to the TCP2 core 36 and the TCP2 core 36 confirms the packet of the user ID (step S186), and transmits a "USER" message from the mailer to the mail system core 37. The mail system core 37 analyzes the "USER" message and saves the user ID temporarily (temporary saving) in the storage medium 38 (see FIG. 3, FIG. 5) (step S187). Here, the temporary saving means a step in which authentication has not been attained by the password confirmation or the like, that is, saving of a previous step for the formal saving after the authentication. Then, the user ID is transmitted to the mail server 41 connected to the network 40.

A response to the user ID is returned from the mail server 41 to the TCP2 core 36, and the TCP2 core 36 confirms the packet of the user ID response message and sends an "+OK" message which is the result thereof to the mail system core 37 (step S187). The "+OK" message is a message telling "User recognized, send password" in the mail server 41. The mail system core 37 analyzes the "+OK" message and transfers the user ID response from the mail server 41 to the mailer 31 (step S188).

Next, the password message is transmitted from the existing mailer 31 of the client apparatus A to the mail server 41 connected to the network 40. The TCP2 core 36 confirms the password message transmitted from the mailer 31 and transmits the packet of the confirmed password message to the mail system core 37 (step S189). The mail system core 37 receives and analyzes the "PASS" message from the TCP2 core 36. As a result of the analysis, the mail system core 37 saves the password temporarily (temporary saving) in the storage medium 38 and transmits the password to the mail server 41 connected to the network 40 (step S190).

Next, the password response message is sent from the mail server 41 to the client apparatus A. The TCP2 core 36 confirms the packet of the password response and transmits the packet of the password response message to the mail system core 37 (step S191). The mail system core 37 analyzes the packet of the "+OK" message which is the password response message, and acquires the key information from the user ID and the password already registered in the storage medium 38 and the temporarily saved user ID and password (step S192). Then, the received password response is transmitted to the mailer 31.

Subsequently, continued flow on the encrypted mail receiving side will be described based on FIG. 20. Upon receiving the transmission of the password response from the mail system core 37, the mailer 31 issues a mail download request. The TCP2 core 36 confirms the packet of the download request from the mailer 31 and reports it as a "RETR" message to the mail system core 37 (step S193). The mail system core 37 analyzes the "RTER" message and sends the mail download request to the mail server 41 connected to the network 40 (step S194). Here, the "RETR" message is a POP3 fundamental command for receiving a message specified by a parameter. When a line without a message is specified as a parameter, it is configured such that "−ERR message does not exist" is returned.

Thereafter, the mail server 41 transmits a download response ("+OK" message) and a mail-message. The TCP2 core 36 confirms the packets of the download response ("+OK" message) and the mail-message and sends them to the mail system core 37 (step S195).

The mail system core 37 analyzes the download response ("+OK" message) and the mail-message and if it is an encrypted text, notifies the "mail state" and the address of the sender to the TCP2 mail application unit 35. Here, the "mail state" means a situation whether an "encrypted text" or not, whether an "HTML" file or not, or with or without an "attached file". It should be noted that the packet is not transmitted to the TCP2 mail application unit 35 and is held in the mail system core 37 (step S196). Here, it is also possible depending on the implemented mode of the TCP2 driver 34 to make setting such that the mail message is saved in the storage medium 38 of the mail system core 37.

The TCP2 mail system application unit 35 displays the mail state and the sender address transmitted from the mail system core 37 on the display screen of the output apparatus 33 (step S197). Then, when the mail recipient sees the mail list displayed on the output apparatus 33 and pushes down a "reception" button of the input apparatus 32 (step S198), the mail is received and the received mail is supplied to the mailer 31 of the client apparatus A via the mail system core 37 in the form of the encrypted text (step S199).

Here, fundamentally, the encrypted text is supplied to the mailer 31, but it is also possible depending on the system setting to decrypt it by the decryption unit 52 (see FIG. 5) to be supplied with a plaintext to the mailer. In step S198, when a deletion button is pushed down instead of the reception button, the mail for which the deletion button is pushed down is deleted in the mail/attached-file deletion unit 54 (see FIG. 5) of the mail system core 37.

In this manner, the download response and the received mail message are transmitted to the mailer 31 of the client apparatus A and the mail-message is saved in the storage medium 39 in the form of an encrypted text (plaintext depending on the case) (step S200). The mailer 31 sends the message deletion request "DELE" to the TCP2 core 36. The TCP2 core 36 confirms the packet of the message deletion request (step S201) and sends it to the mail system core 37. The mail system core 37 analyzes the message deletion request "DELE" and sends the message deletion request to the mail server 41 (step S202).

Upon receiving the message deletion request, the mail server 41 sends a message deletion response to the TCP2 core 36 and the TCP2 core 36 confirms the packet (step S203). The mail system core 37 analyzes the "+OK" message of the message deletion response and sends it to the mailer 31 (step S204).

When receiving the message deletion response, the mailer 31 sends a termination declaration message "QUIT" to the mail server 41, and the TCP2 core 36 which receives the termination declaration message confirms the packet (step S205) and sends it as a "QUIT" message to the mail system core 37. The mail system core 37 analyzes the "QUIT" message and sends the termination declaration to the mail server 41 (step S206).

The mail server 41 issues a termination declaration response to the termination declaration and sends it to the TCP2 core 36 of the client apparatus A. Then, the TCP2 core 36 of the client apparatus A confirms the packet of the received termination declaration response and sends it as the SMTP response code "+OK" message to the mail system core 37 (step S207). The mail system core 37 analyzes the "+OK" message and sends the termination declaration response thereof to the mailer 31 of the terminal (step S208). Accordingly, the flow on the encrypted mail receiving side is all completed and the TCP communication between the mailer 31 of the client apparatus A and the mail server 41 (client apparatus B) is cut off.

<Description of Embodiment of TCP2 Mail System>

Finally, the whole flow of the TCP2 mail system is described briefly based on FIG. 21.

As shown in FIG. 21, the client apparatus A and the client apparatus B carry out mail communication through the respective mail server A and mail server B. First, a key exchange fixed-form mail is transmitted from the client apparatus A, where the TCP2 driver of the client apparatus A adds and saves a key original value. The key exchange fixed-form mail from the client apparatus is transmitted to the TCP2 driver of the client apparatus B via the mail servers A and B and here, the key original value is saved and received by the mailer of the client apparatus B.

Next, the key exchange fixed-form mail is transmitted from the client apparatus B to the client apparatus A. Here, the key original value is added and saved in the TCP2 driver of the client apparatus B and a new key is produced. Then, the key exchange fixed-form mail is transmitted to the client apparatus A via the mail servers B and A. The key original value is saved in the TCP2 driver of the client apparatus A, a new key is produced and thereafter, the mailer receives the key exchange received mail. Transmission and reception of the key exchange fixed-form mail is carried out only at the initial time and it becomes unnecessary in the mail communication thereafter.

A mail is transmitted from the client apparatus A. First, the mailer of the client apparatus A sends a plaintext mail to the TCP2 driver and the TCP2 driver encrypts the plaintext mail. Then, the encrypted mail is transmitted to the client apparatus B via the mail servers A and B. The TCP2 driver of the client apparatus B, depending on the setting thereof, sends it to the mailer of the terminal with the encrypted text or sends it to the mailer in a state of plaintext after decryption. The mail transmission from the client apparatus B to the client apparatus A is also carried out similarly. The above is an outline of the TCP2 mail system.

As described above, in a mail system using TCP2 of the present invention, mail communication is carried out using TCP2 having a high security function, so that an extremely reliable protection function is exerted in particular with respect to data leakage, falsification, masquerading, approach and attack compared with mail communication according to the existing encryption processing.

The present invention is not limited to the embodiments described above and it should be appreciated that various other embodiments may be included without departing from the scope of the present invention described in the claims.

Description Of Reference Numerals

31 . . . existing mailer, 32 . . . input apparatus, 33 . . . output apparatus, 34 . . . TCP2 driver, 35 . . . TCP2 mail system application unit, 36 . . . TCP2 core, 37 . . . mail system core, 38, 39 . . . storage medium, 40 . . . network, 41 . . . mail server, 50 . . . authentication unit, 51 . . . encryption unit, 52 . . . decryption unit, 53 . . . key exchange unit

The invention claimed is:

1. A client apparatus connected to a network and including an existing mailer carrying out e-mail communication between a plurality of client apparatuses, comprising:
 a transmission control protocol 2 (TCP2) driver including a TCP2 core and a mail system core; and
 a TCP2 mail system application unit other than said existing mailer, including means for recognizing a packet of the e-mail transmitted from one of the existing mailer and SMTP or POP3 protocols and for transmitting the packet to said mail system core, the TCP2 mail system application unit and the TCP2 driver providing transport layer encryption and decryption of e-mail packets, wherein
 said mail system core includes means for encrypting or decrypting the e-mail transmitted and received, means for carrying out key exchange with other client apparatuses, means for saving IP address and port of said POP3 and IP address and port of said SMTP, means for saving user ID and password, and e-mail addresses of a sender and a receiver, means for saving a key formed by said key exchange, and means for selecting and deleting an encrypted mail, an HTML mail or an attached file,
 said TCP2 mail application unit includes means for carrying out a display of a key status in connection with the e-mail transmitted from said mail system core and for carrying out a list display of a status of encryption or non-encryption of the e-mail, an mail address of the sender, mail type and attached file, and means for displaying the encrypted mail received by said existing mailer in plaintext,
 the e-mail received via said network is selected and processed by said TCP2 driver and thereafter is supplied to said existing mailer, and
 the e-mail transmitted to the other client apparatuses from said existing mailer through said network is set to be transmitted after the other client apparatus of the receiver is confirmed by said TCP2 driver.

2. The client apparatus according to claim 1, wherein the TCP 2 core includes:
 a port search unit to identify a port in accordance with a port request received from the mail system core;
 a hooking process unit to intercept a packet identified in a hooking request from the mail system core,
 wherein responsive to the hooking request from the mail system core, the hooking process unit intercepts a corresponding packet and transmits the corresponding packet to the mail system core.

3. The client apparatus according to claim 2, wherein the hooking request identifies a command packet.

4. The client apparatus according to claim 3, wherein command packets are transmitted without encryption.

5. The client apparatus according to claim 1, wherein each packet of the e-mail transmitted includes an IP header, a TCP header, TCPsec additional information, a payload section, TCPsec authentication data and TCPsec added encryption data to support encryption and decryption of the packet, encryption of the packet excluding the IP and TCP headers.

6. A mail system carrying out e-mail communication between a plurality of client apparatuses connected to a network and including an existing mailer, wherein:
 said client apparatus includes a transmission control protocol 2 (TCP2) driver including a TCP2 core and a mail system core and a TCP2 mail application unit in addition to said existing mailer, the TCP2 mail application unit and the TCP2 driver providing transport layer encryption and decryption of e-mail packets,
 said TCP2 core of said TCP2 driver is connected to one of existing mail means and a network and sends a packet of the e-mail transmitted from a protocol of SMTP or POP3 of a mail server to said mail system core,
 said mail system core carries out encryption or decryption of the transmitted and received e-mail, carries out key exchange with a sender or receiver, saves IP address and port number of said POP3, IP address and port number of said SMTP, user ID and password, e-mail addresses of the sender and the receiver and a key formed by said key exchange in a storage medium, and selectively deletes said received e-mail, and
 said TCP2 mail system application unit carries out a display of a key status in connection with the e-mail transmitted from said mail system core and carries out a list display of the transmitted and received e-mails and a plaintext display of the encrypted e-mail received by said existing mailer.

7. A non-transitory computer-readable medium encoded with computer-readable instructions thereon for carrying out mail communication between a plurality of client apparatuses connected to a network and including an existing mailer, the computer-readable instructions when executed by a client apparatus computer cause the client apparatus computer to perform a method comprising:
 providing a transmission control protocol 2 (TCP2) mail system function having three functions of a TCP2 core, a mail system core and a TCP2 mail application other than the existing mailer function is implemented on each of client apparatus computers the TCP2 mail application and the TCP2 core providing transport layer encryption and decryption of e-mail packets;
 recognizing, in the TCP2 core, a packet of the e-mail transmitted from the existing mailer, or a protocol of a mail server SMTP or POP3 connected to a network and transmitting the packet to a mail system core;

carrying out, at the mail system core, transport level encryption or decryption of the transmitted and received e-mail;

carrying out, at the mail system core, key exchange with a sender or receiver;

saving, at the mail system core, an IP address and port number of the POP3, IP address and port number of the SMTP, user ID and password, e-mail addresses of the sender and receiver and a key formed by said key exchange on a storage medium and deleting the received e-mail selectively;

carrying out, at the TCP2 mail system application, a display of a key status in connection with the e-mail transmitted from said mail system core, carrying out a list display of the transmitted and received mails; and carrying out, at the TCP2 mail system application, a plaintext display of the encrypted mail received by said existing mailer.

* * * * *